US010984661B2

(12) United States Patent
Yoshii et al.

(10) Patent No.: US 10,984,661 B2
(45) Date of Patent: Apr. 20, 2021

(54) INFORMATION PROCESSING DEVICE AND INFORMATION PROCESSING METHOD

(71) Applicant: SONY CORPORATION, Tokyo (JP)

(72) Inventors: Kazuma Yoshii, Tokyo (JP); Sho Tanaka, Tokyo (JP)

(73) Assignee: SONY CORPORATION, Tokyo (JP)

(*) Notice: Subject to any disclaimer, the term of this patent is extended or adjusted under 35 U.S.C. 154(b) by 126 days.

(21) Appl. No.: 16/301,614

(22) PCT Filed: May 10, 2017

(86) PCT No.: PCT/JP2017/017664
§ 371 (c)(1),
(2) Date: Nov. 14, 2018

(87) PCT Pub. No.: WO2017/208754
PCT Pub. Date: Dec. 7, 2017

(65) Prior Publication Data
US 2019/0325758 A1    Oct. 24, 2019

(30) Foreign Application Priority Data
Jun. 2, 2016  (JP) .............................. JP2016-110807

(51) Int. Cl.
*G08G 5/00*  (2006.01)
*B64C 39/02*  (2006.01)
(Continued)

(52) U.S. Cl.
CPC ......... *G08G 5/0047* (2013.01); *B64C 39/024* (2013.01); *G05D 1/0011* (2013.01);
(Continued)

(58) Field of Classification Search
CPC .... G08G 5/0047; G08G 5/003; B64C 39/024; G05D 1/0011; G05D 1/0088; G05D 1/101; G06K 9/00812
(Continued)

(56) References Cited

U.S. PATENT DOCUMENTS 8,686,326 B1 *  4/2014  Dennison ................ G01S 3/784
244/3.16
8,698,895 B2    4/2014  Nerayoff et al.
(Continued)

FOREIGN PATENT DOCUMENTS

CA        2891849 A1    6/2014
CN      104981377 A    10/2015
(Continued)

OTHER PUBLICATIONS

International Search Report and Written Opinion of PCT Application No. PCT/JP2017/017664, dated Aug. 15, 2017, 10 pages of ISRWO.

(Continued)

*Primary Examiner* — Peter D Nolan
*Assistant Examiner* — Wae L Louie
(74) *Attorney, Agent, or Firm* — Chip Law Group

(57) ABSTRACT

An information processing device is provided, for example, in a vehicle. A control unit of the information processing device executes flight control of an unmanned flying object such that the unmanned flying object moves to a destination and acquires a captured image from the unmanned flying object. The control unit performs adjustment of an arrival time at the destination, for example, depending on a congestion situation or movement guidance of the vehicle to an empty space at the destination on the basis of the captured image of the destination or a surrounding area of the destination. Further, retrieval of a movement route in the
(Continued)

destination is performed on the basis of the captured image obtained by causing the unmanned flying object to move inside the destination and imaging the inside of the destination, and the detected movement route is set in a moving object which is used for movement in the destination.

13 Claims, 18 Drawing Sheets

(51) Int. Cl.
  *G05D 1/00* (2006.01)
  *G05D 1/10* (2006.01)
  *G06K 9/00* (2006.01)

(52) U.S. Cl.
  CPC .......... *G05D 1/0088* (2013.01); *G05D 1/101* (2013.01); *G06K 9/00812* (2013.01); *G08G 5/003* (2013.01); *B64C 2201/127* (2013.01)

(58) Field of Classification Search
  USPC ............................................................ 701/3
  See application file for complete search history.

(56) References Cited

U.S. PATENT DOCUMENTS

| | | | | |
|---|---|---|---|---|
| 9,019,375 | B1* | 4/2015 | Whelan | F41F 7/00 |
| | | | | 348/144 |
| 2007/0221782 | A1* | 9/2007 | Cerchie | B64C 13/505 |
| | | | | 244/75.1 |
| 2009/0040307 | A1* | 2/2009 | Rubin | B60R 11/04 |
| | | | | 348/153 |
| 2009/0045296 | A1 | 2/2009 | Cerchie et al. | |
| 2010/0286847 | A1 | 11/2010 | Cerchie et al. | |
| 2012/0200703 | A1* | 8/2012 | Nadir | H04N 5/3454 |
| | | | | 348/144 |
| 2014/0022051 | A1* | 1/2014 | Levien | G05D 1/0202 |
| | | | | 340/5.2 |
| 2014/0024999 | A1* | 1/2014 | Levien | G16H 40/67 |
| | | | | 604/66 |
| 2014/0036076 | A1* | 2/2014 | Nerayoff | G06K 9/00791 |
| | | | | 348/148 |
| 2015/0142211 | A1* | 5/2015 | Shehata | H04W 4/42 |
| | | | | 701/2 |

FOREIGN PATENT DOCUMENTS

| | | |
|---|---|---|
| JP | 11-142174 A | 5/1999 |
| JP | 2009-530185 A | 8/2009 |
| JP | 5225263 B2 | 7/2013 |
| JP | 2015-184821 A | 10/2015 |
| JP | 5819555 A | 11/2015 |
| JP | 5819555 B1 | 11/2015 |
| JP | 2016-506561 A | 3/2016 |
| WO | 2008/054470 A2 | 5/2008 |
| WO | 2014/085316 A1 | 6/2014 |

OTHER PUBLICATIONS

Office Action in JP 2018-8520751 dated Oct. 18, 2018.
Office Action for JP Patent Application No. 2018-520751 dated Dec. 1, 2020, 5 pages of Office Action and 3 pages of English Translation.

* cited by examiner

INFORMATION PROCESSING DEVICE AND INFORMATION PROCESSING METHOD

CROSS REFERENCE TO RELATED APPLICATIONS

This application is a U.S. National Phase of International Patent Application No. PCT/JP2017/017664 filed on May 10, 2017, which claims priority benefit of Japanese Patent Application No. JP 2016-110807 filed in the Japan Patent Office on Jun. 2, 2016. Each of the above-referenced applications is hereby incorporated herein by reference in its entirety.

TECHNICAL FIELD

The present technology relates to an information processing device and an information processing method that can improve convenience when using a facility of a destination or the like.

BACKGROUND ART

Conventionally, a navigation system that displays a route from a current location to a destination on a screen and visually provides a user with information has been widely used. Further, Patent Document 1 discloses that advance confirmation or contact is enabled by automatically calling a facility of a destination and necessary information can be acquired before arriving at the destination.

CITATION LIST

Patent Document

Patent Document 1: Japanese Patent Application Laid-Open No. 11-142174

SUMMARY OF THE INVENTION

Problems to be Solved by the Invention

However, in the method of performing advance confirmation or contact by automatically calling, in a case where communication with a communication partner is not set up or a case where information supplied from the communication partner does not indicate the newest state, for example, a case where a user may arrive at a desired facility when the desired facility is in a congested state and cannot efficiently use the desired facility.

Therefore, the present technology provides an information processing device and an information processing method that can improve convenience when using a facility of a destination or the like.

Solution to Problems

A first aspect of the present technology lies in
  an information processing device including a control unit configured to execute flight control of an unmanned flying object and movement control associated with a destination on the basis of a captured image of the destination or a surrounding area of the destination obtained by causing the unmanned flying object to move to the destination through the flight control and causing the unmanned flying object to image the destination.

In the present technology, an information processing device is provided in a vehicle, and a control unit of the information processing device executes flight control of an unmanned flying object such that the unmanned flying object moves to a destination and images the destination or the surrounding area of the destination. Further, the control unit determines a congestion situation of a facility of a destination or the like on the basis of the captured image of the destination or the surrounding area of the destination, executes movement control of controlling a movement route or a speed of the vehicle on the basis of a determination result of the congestion situation, and adjusts an arrival time at the destination.

Further, in a case where a parking lot is set as the destination, the control unit retrieves an empty space on the basis of a captured image of the parking lot and performs movement guidance to the detected empty space, for example, by causing the unmanned flying object to move from a position of the vehicle to the position of the detected empty space.

Further, the control unit causes the unmanned flying object to move in the destination and to capture an image, retrieves a movement route in the destination on the basis of a captured image in the destination, and sets the detected movement route in a moving object which is used for movement in the destination.

Further, when an occupant gets off the vehicle, the control unit changes a control authority over flight control of the unmanned flying object to an information processing device of the occupant getting off the vehicle, and executes continuous flight control, for example, by providing information which has been used for the flight control of the unmanned flying object to the information processing device of the occupant getting off the vehicle in changing the control authority.

Furthermore, a display unit is provided in the information processing device, and the control unit sets an imaging direction of the unmanned flying object depending on the arrangement of the display unit or sets an image size of a captured image generated by the unmanned flying object depending on an image display size on the display unit.

A second aspect of the present technology lies in
  an information processing method including:
  causing a control unit to execute flight control of an unmanned flying object; and
  causing the control unit to execute movement control associated with a destination on the basis of a captured image of the destination or a surrounding area of the destination obtained by causing the unmanned flying object to move to the destination through the flight control and causing the unmanned flying object to image the destination.

Effects of the Invention

According to the present technology, flight control of an unmanned flying object and movement control associated with a destination on the basis of a captured image of a destination or a surrounding area of the destination obtained by causing the unmanned flying object to move to the destination through the flight control and capturing an image using the unmanned flying object are executed by the control unit. Accordingly, it is possible to improve convenience when using a facility of a destination or the like. Incidentally, the effects described in this specification are examples and are not limited, but additional effects may be achieved.

BRIEF DESCRIPTION OF DRAWINGS

FIG. 6 is a diagram illustrating an operation of changing a display resolution, a search range of an unmanned flying object, or the like.

MODE FOR CARRYING OUT THE INVENTION

Hereinafter, embodiments of the technology disclosed in this specification will be described in detail with reference to the accompanying drawings. Incidentally, the description will be made in the following order.

1. Entire configuration of information processing system
2. Configuration of information processing device and unmanned flying object
3. Operation of information processing system
3-1. First operation example
3-2. Second operation example
3-3. Third operation example
3-4. Fourth operation example 1. Entire Configuration of Information Processing System In an information processing system according to the present technology, an unmanned flying object such as a drone is caused to move to a destination by an information processing device. In addition, by causing the unmanned flying object to image the destination or a surrounding area of the destination and causing the information processing device to execute movement control on the basis of a captured image captured by the unmanned flying object, it is possible to improve convenience when using a facility of the destination or the like. Incidentally, the information processing device may be unified with a vehicle or may be individually provided.

Figure 1:
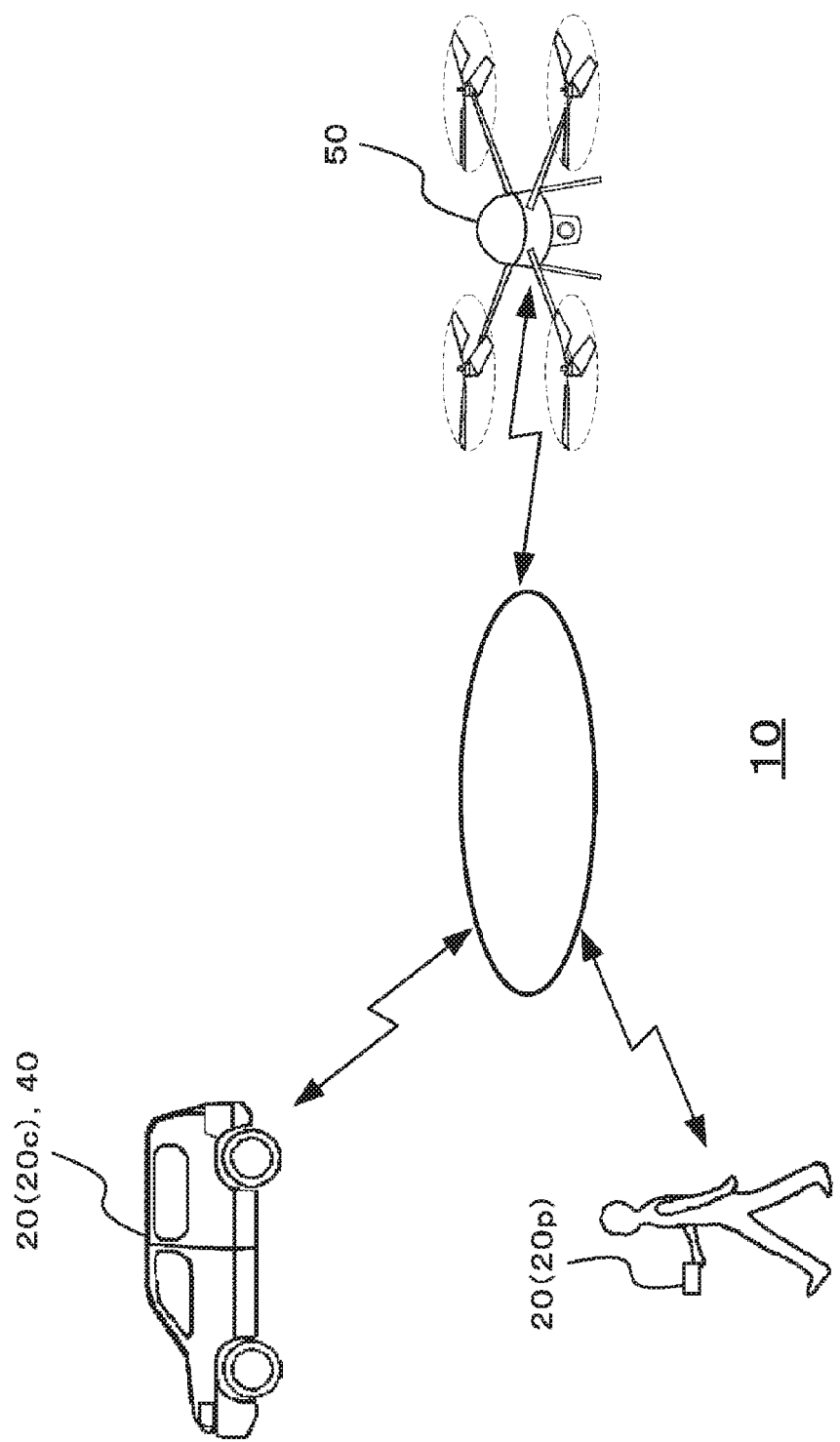
FIG. 1 is a diagram illustrating a configuration of an information processing system.

FIG. 1 illustrates a configuration of the information processing system. The information processing system 10 includes an information processing device 20, a vehicle 40, and an unmanned flying object 50 such as a drone. The information processing device 20 may be unified with the vehicle 40 (or may be incorporated into the vehicle) or may be configured as a device which is physically independent from the vehicle 40. For example, by using an information terminal device which is portable by a user as the information processing device 20, the user can use information transmitted from the unmanned flying object 50 even in a state in which the user gets off the vehicle. In addition, the information processing device can be also configured in a manner in which some functional modules are shared by a device incorporated into the vehicle. Incidentally, in a fourth operation example which will be described later, an information processing device unified with the vehicle is referred to as a vehicle information processing device 20c and an information terminal device which is portable by a user is referred to as a portable information processing device 20p.

The information processing device 20 transmits position information of a destination and flight control information to the unmanned flying object 50 and causes the unmanned flying object 50 to move to a destination or causes the unmanned flying object 50 to capture an image. In addition, the information processing device 20 acquires a captured image of the destination or the surrounding area of the destination from the unmanned flying object 50 and performs control of the vehicle 40, setting of a small-size moving object which will be described later on the basis of the acquired captured image, or the like.

The unmanned flying object 50 is provided in the vehicle 40 or in a specific base, communicates with the information processing device 20, and moves to a destination, captures an image, or the like on the basis of an instruction from the information processing device 20.

2. Configuration of Information Processing Device and Unmanned Flying Object

Figure 2:
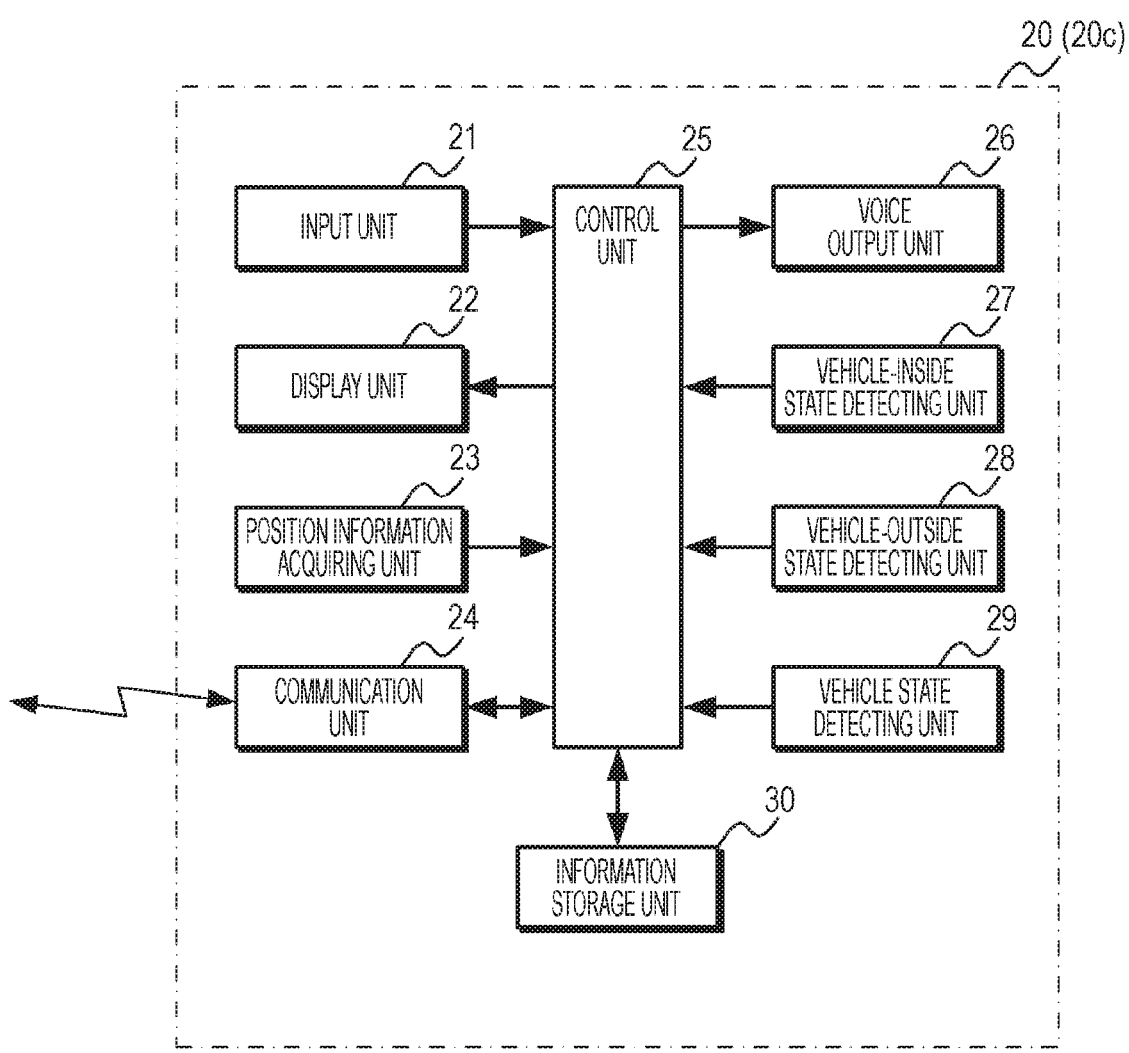
FIG. 2 is a diagram illustrating a functional configuration of an information processing device.

FIG. 2 illustrates a functional configuration of an information processing device according to the present technology. The information processing device 20 includes an input unit 21, a display unit 22, a position information acquiring unit 23, a communication unit 24, and a control unit 25.

The information processing device 20 may be unified with the vehicle 40 as described above or may use a device which is physically independent from the vehicle 40, for example, an information terminal device such as a smartphone which is carried by a user, as the information processing device 20.

The input unit 21 is a unit that is used for a user to perform an input operation on the information processing device 20. The user can input a destination, a destination arrival time, a movement purpose, and information which is used to select a movement route or a transit point to the information processing device 20 via the input unit 21.

The input unit 21 may include, for example, a touch panel or a voice input function. In addition, an information terminal device may be shared by the input unit 21. Incidentally, user which is mentioned herein includes a driver and an occupant other than the driver.

The display unit 22 displays a captured image which is acquired from the unmanned flying object 50 by the information processing device 20 or a setting screen for position information of a destination, control information of the unmanned flying object, or the like, for example.

The display unit 22 may include, for example, a touch panel and be unified with the input unit 21. In addition, an onboard device such as an onboard display, a head-up display, or a car navigation device may be shared as the display unit 22 or a screen of the information terminal device carried by the user may be used as the display unit 22.

The position information acquiring unit 23 acquires information regarding a current location. For example, the position information acquiring unit 23 receives global navigation satellite system (GNSS) signals from GNSS satellites (for example, global positioning system (GPS) signals from GPS satellites), performs positioning, and generates position information including latitude, longitude, and altitude of the current location. Alternatively, the position information acquiring unit 23 may specify the current location on the basis of information from a wireless access point using PlaceEngine (registered trademark) or the like. In addition, the position information acquiring unit 23 may acquire position information from a positioning unit of the vehicle or the information terminal device carried by the user.

The communication unit 24 includes, for example, a cellular communication protocol such as global system of mobile communications (GSM) (registered trademark), WiMAX, long term evolution (LTE), or LTE-Advanced (LTE-A), a wireless LAN such as Wi-Fi (registered trademark), and a general communication interface such as Bluetooth (registered trademark) and can access a device (for example, an application server, a control server, a management server, or the like) which is present over a network (for example, the Internet, a cloud network, or a provider-specific network). In addition, the communication unit 24 communicates with the unmanned flying object 50 and controls the unmanned flying object 50 or acquires a captured image from the unmanned flying object 50. Incidentally, regarding communication between the information processing device 20 and the unmanned flying object 50, wireless communication may be performed between the information processing device 20 and the unmanned flying object 50 or communication may be performed via the network. For example, in a case where the unmanned flying object 50 is provided in the vehicle 40, the information processing device 20 performs wireless communication with the unmanned flying object 50 without passing through the network. In addition, in a case where the unmanned flying object 50 is provided in a specific base, the information processing device 20 communicates with the unmanned flying object 50 via the network.

The control unit 25 comprehensively controls the entire operation of the information processing device 20. Specifically, the control unit 25 performs an information display process of the display unit 22 based on information input from the user via the input unit 21, a graphical user interface (GUI) process for facilitating an input operation of the user, communication with the unmanned flying object 50 via the communication unit 24, execution of flight control, acquisition of a captured image, sensor information, or the like. In addition, a voice output unit 26 is provided, and the control unit 25 allows a user to perform selection of a destination, change of a selected destination, or selection or change of a route to a destination in a dialog manner by display or voice using the input unit 21 or the display unit 22 and the voice output unit 26. In addition, for example, the control unit 25 may execute driving control on the basis of a captured image acquired from the unmanned flying object 50 during automatic driving along a selected route or may automatically execute driving control on the basis of a captured image acquired from the unmanned flying object 50 during manual driving. In addition, the control unit 25 may perform vehicle air-conditioning control on the basis of sensor information acquired from the unmanned flying object 50 such that an optical air-conditioning environment corresponding to an environmental situation is obtained at the time of arriving at the destination.

In a case where the information processing device 20 is provided in a vehicle, the information processing device 20 may further include a vehicle-inside state detecting unit 27, a vehicle-outside information detecting unit 28, and a vehicle state detecting unit 29.

The vehicle-inside state detecting unit 27 includes, for example, an onboard camera (a vehicle-inside camera) that images the inside of the vehicle, a weight sensor that detects weight applied to a driver seat or other seats (such as a passenger seat and a rear seat) (whether or not a person sits on the seat) or change in weight of a passenger compartment, a voice sensor such as a microphone, and the like.

For example, whether or not a user is present can be checked on the basis of a recognition result of an image captured by the vehicle-inside camera or the change in weight of the seat or the passenger compartment from the weight sensor. In addition, a passenger compartment situation can be estimated on the basis of the recognition result of an image captured by the vehicle-inside camera. In addition, vehicle-inside information is generated on the basis of a face recognition result of an image captured by the vehicle-inside camera, details of conversation in the vehicle collected by the voice sensor, a detection result from a biometric sensor, or the like.

The vehicle-outside information detecting unit 28 includes, for example, an environment sensor that detects current weather or atmospheric phenomena and a surrounding information detection sensor that detects nearby vehicles, obstacles, pedestrians, a situation of an accident occurring around the vehicle, and the like.

The control unit 25 may appropriately change information provided from the vehicle inside on the basis of the detection result of the vehicle-outside information detecting unit 28. The control unit may present candidates for a destination or the like via the display unit 22, for example, depending on the weather, the congestion situation of a road, or the like.

The vehicle state detecting unit 29 includes, for example, a gyro sensor that detects an angular velocity of an axial rotation of a vehicle body, an acceleration sensor that detects acceleration of the vehicle, or a sensor that detects an amount of depression on an accelerator pedal, an amount of depression on a brake pedal, a steering angle of a steering wheel, an engine rotation speed, a rotation speed of wheels, or the like.

In addition, an information storage unit 30 may be provided in the information processing device 20 to store a variety of information. For example, by storing map information in the information storage unit 30, the control unit 25 can perform navigation to a destination, determination of an approaching state to a destination, and the like on the basis of the map information stored in the information storage unit 30 and the position information acquired by the position information acquiring unit 23. In addition, in a case where the unmanned flying object 50 is used, the control unit 25 sets a scheduled flight route to a destination and stores the set scheduled flight route, information of a route in which the unmanned flying object 50 has flown, or the like in the information storage unit 30.

Figure 3:
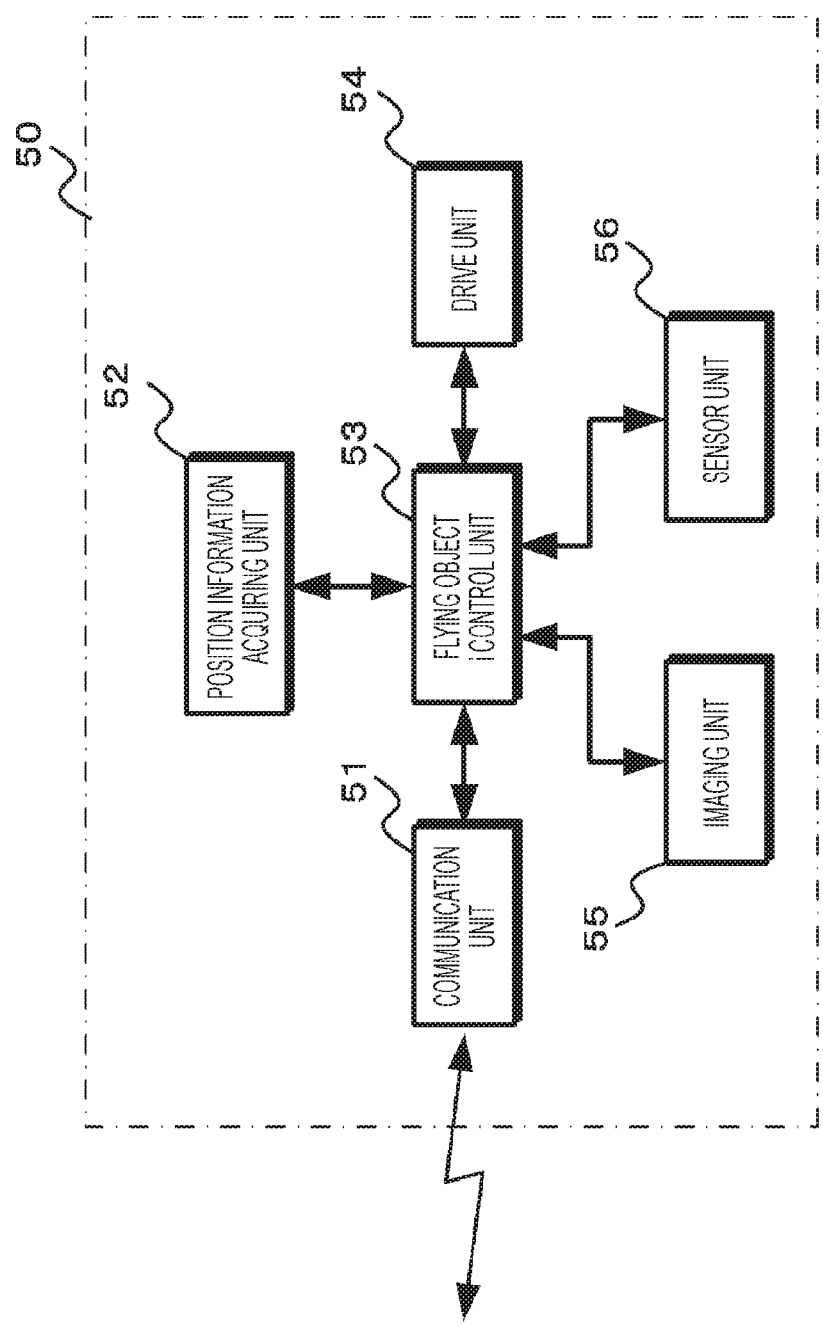
FIG. 3 is a diagram illustrating a functional configuration of an unmanned flying object.

FIG. 3 illustrates a functional configuration of an unmanned flying object. The unmanned flying object 50 includes a communication unit 51, a position information acquiring unit 52, a flying object control unit 53, a drive unit 54, an imaging unit 55, and a sensor unit 56.

The communication unit 51 communicates with the information processing device 20 and outputs received information to the flying object control unit 53. In addition, the communication unit 51 transmits captured images generated by the imaging unit 55 or sensor information generated by the sensor unit 56 to the information processing device 20.

The position information acquiring unit 52 acquires information regarding a current location of the unmanned flying object 50. Similarly to the position information acquiring unit 23 of the information processing device 20, the position information acquiring unit 52 receives GNSS signals or the like, performs positioning, and generates position information including current latitude, longitude, and altitude. Alternatively, the position information acquiring unit 52 may specify the current location on the basis of information from a wireless access point.

The flying object control unit 53 causes the unmanned flying object 50 to move to a destination indicated by information from the information processing device 20 by generating a drive signal on the basis of the information from the information processing device 20 received by the communication unit 51 and the position information acquired by the position information acquiring unit 52 and outputting the generated drive signal to the drive unit 54. In addition, the flying object control unit 53 controls the operation of the imaging unit 55 such that the destination or the surrounding area of the destination is imaged. In addition, the flying object control unit 53 performs a process of transmitting the generated captured images to the information processing device 20. In addition, the flying object control unit 53 executes control for causing the unmanned flying object 50 to move to a housing location or the like.

The drive unit 54 includes a mechanism that performs floating and movement of the unmanned flying object 50, for example, a propeller and a motor for rotating the propeller. The drive unit 54 drives the motor or the like on the basis of a drive signal from the flying object control unit 53 such that the unmanned flying object 50 floats and moves. The imaging unit 55 performs an imaging operation on the basis of a control signal from the flying object control unit 53 and generates, for example, captured images of a destination, the surrounding area of the destination, and the inside of the destination. The sensor unit 56 includes sensors that can measure an environmental situation, for example, temperature, humidity, and an amount of ultraviolet rays and generates sensor information indicating the measurement results.

3. Operation of Information Providing System

3-1. First Operation Example

Next, an example in a case where an information providing system is used for sightseeing will be described below as a first operation example. In the first operation example, convenience when using a facility of a destination or the like is improved by executing movement control of a vehicle to a destination on the basis of a captured image of the destination or the surrounding area of the destination captured by an unmanned flying object. Incidentally, the information processing device is provided in a vehicle as a configuration unified with a vehicle or a configuration carried by an occupant of the vehicle.

Figure 4:
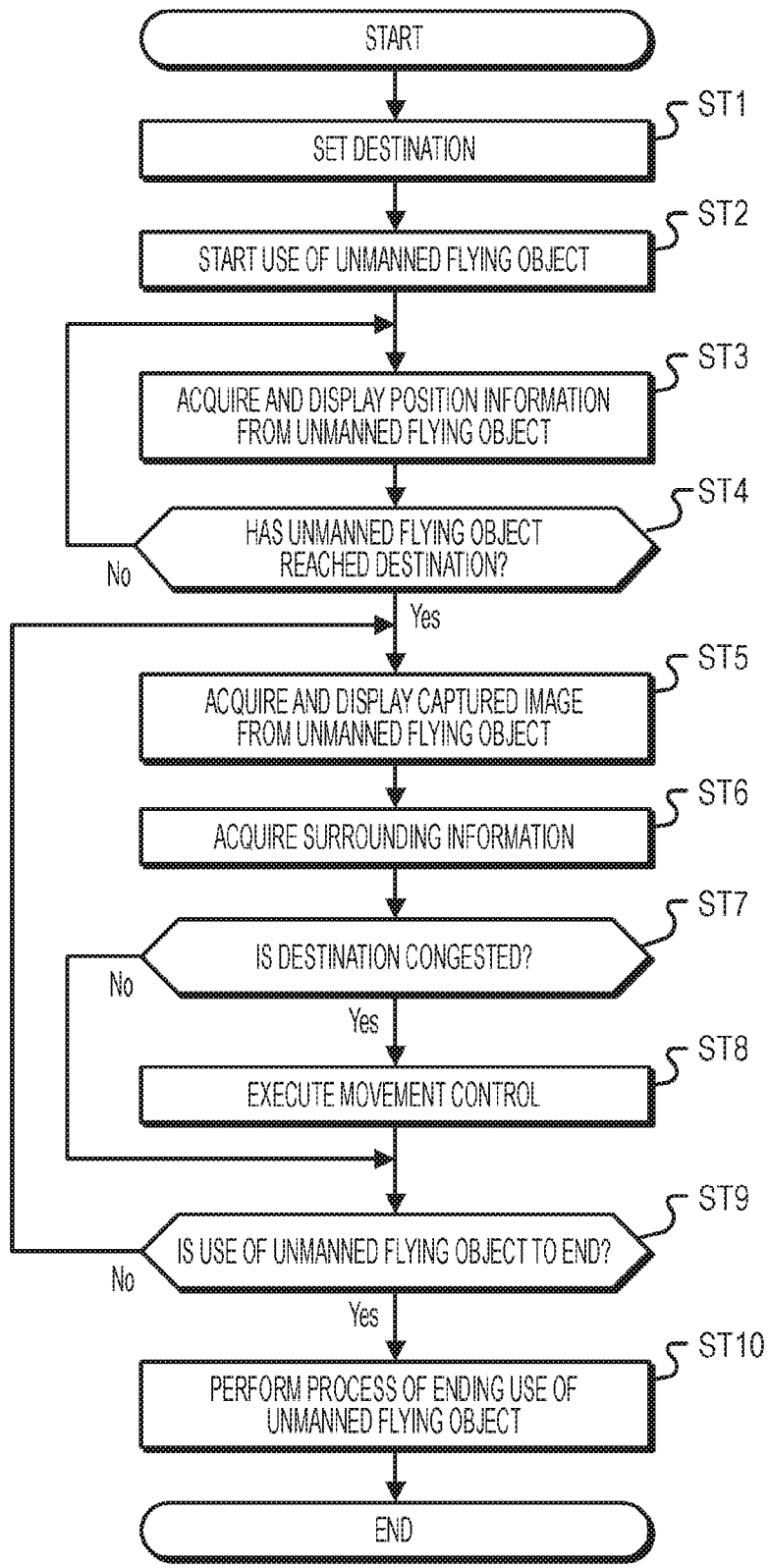
FIG. 4 is a flowchart illustrating a first operation example.

FIG. 4 is a flowchart illustrating the first operation example. In step ST1, the information processing device sets a destination. The information processing device 20 sets the destination set by a user in an unmanned flying object 50 and performs step ST2.

In step ST2, the information processing device starts use of the unmanned flying object. The information processing device 20 starts flight control by communication with the unmanned flying object 50, causes the unmanned flying object 50 to fly to the destination, and then performs step ST3.

In step ST3, the information processing device acquires position information from the unmanned flying object and displays the acquired position information. The information processing device 20 acquires the position information from the position information acquiring unit 52 of the unmanned flying object 50. In addition, the information processing device 20 displays a flight position of the unmanned flying object 50 on the display unit 22 on the basis of the acquired position information and then performs step ST4.

Figure 5:
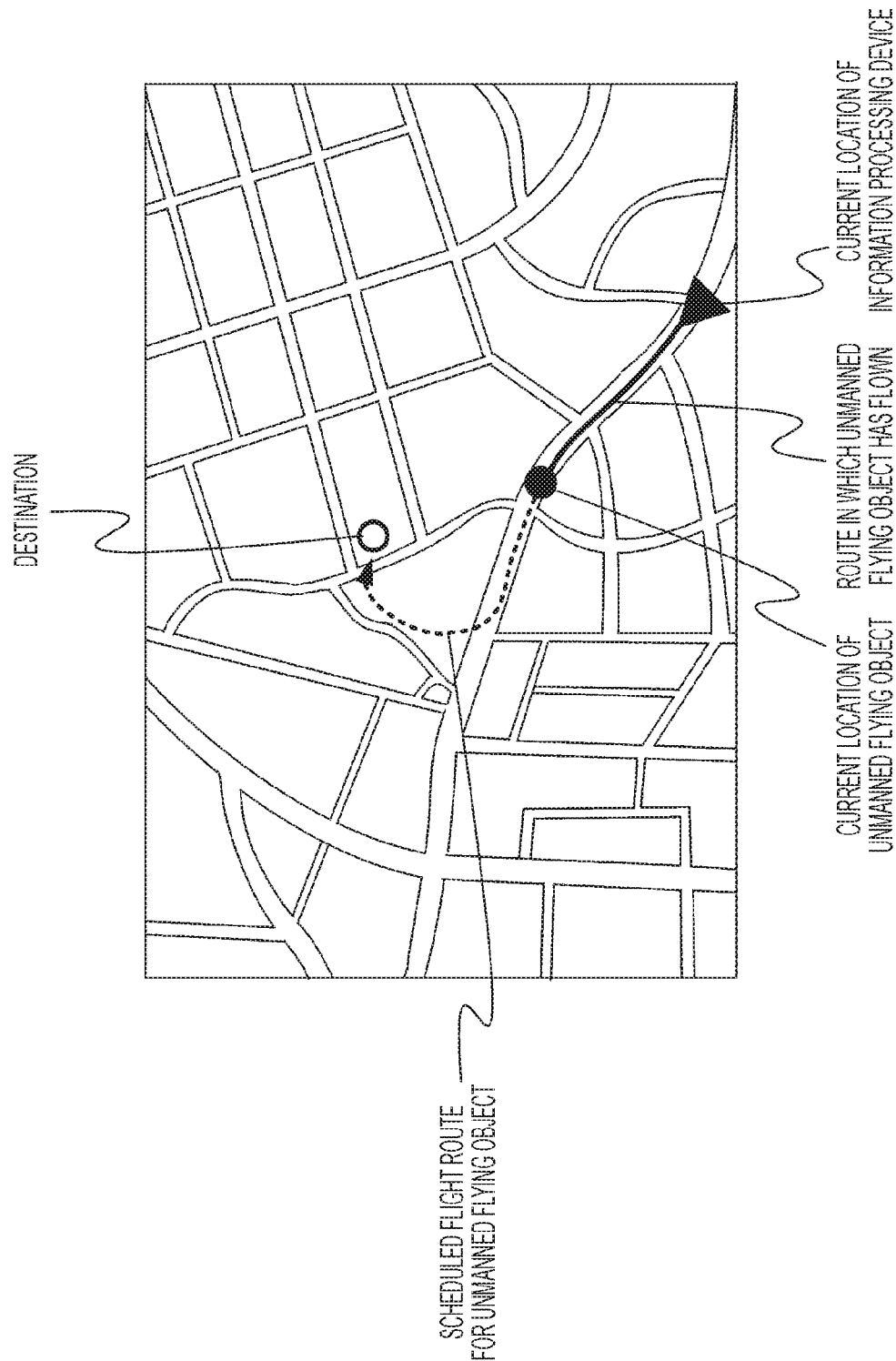
FIG. 5 is a diagram illustrating a display example of a flight position of an unmanned flying object.

FIG. 5 illustrates a display example of a flight position of an unmanned flying object. In display of the flight position, for example, a destination, a position of the unmanned flying object 50, a route in which the unmanned flying object 50 has flown, a scheduled flight route, and a position of the information processing device 20 (the vehicle) are displayed on a map. Incidentally, information of the scheduled flight route is stored in the information storage unit 30. In addition, a user may change the scheduled flight route and may cause the unmanned flying object 50 to fly to the destination along a route desired by the user.

Figure 6:
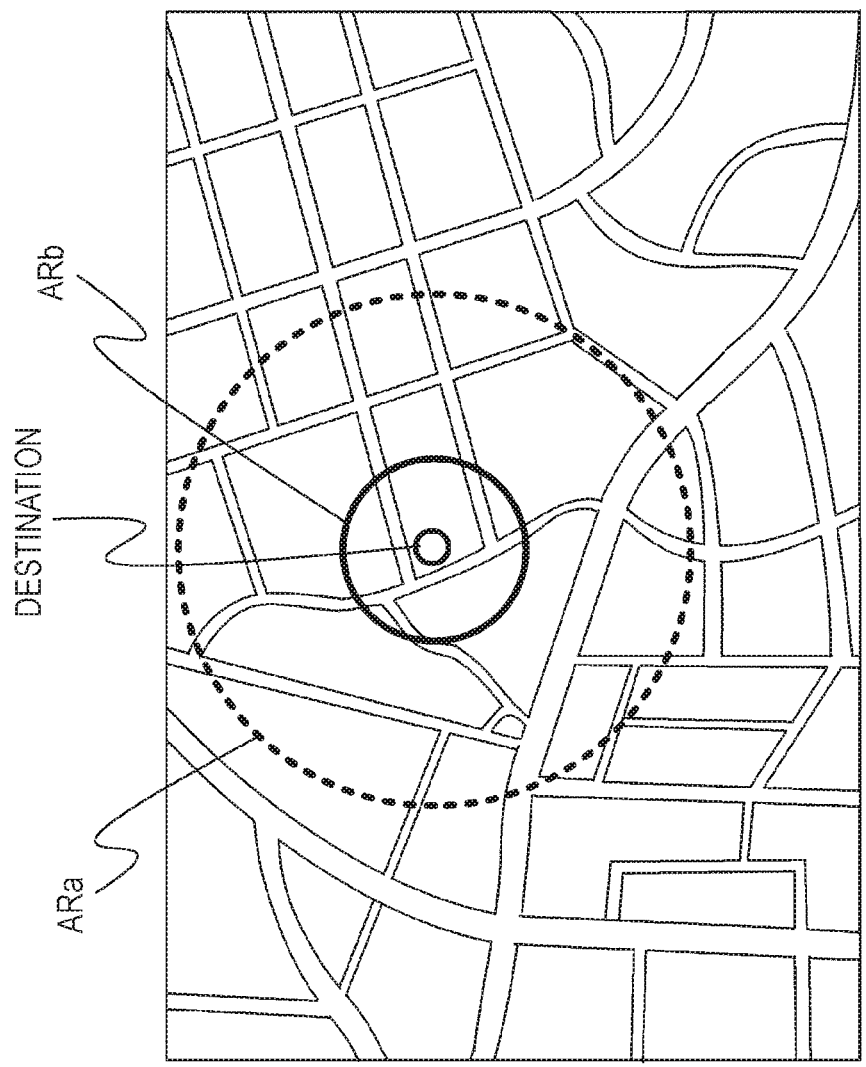

A display resolution, a search range of the unmanned flying object, and the like may be changed by a user's operation. FIG. 6 is a diagram illustrating an operation of changing a display resolution, a search range of an unmanned flying object, and the like, where the input unit 21 and the display unit 22 are configured, for example, as a touch panel. For example, the information processing device sets the search range to a wide area ARa in a case where a user's pressing force on the position of the destination is strong, and sets the search range to a narrow area ARb in a case where the user's pressing force is weak. Further, the information processing device may adjust an imaging time in the imaging unit 55 of the unmanned flying object 50 in response to a user's operation.

Referring back to FIG. 4, in step ST4, the information processing device determines whether the unmanned flying object has reached the destination. The information processing device 20 performs step ST5 in a case where the position information acquired from the unmanned flying object 50 indicates the position of the destination, and repeats step ST3 in a case where the position information does not indicate the position of the destination.

In step ST5, the information processing device acquires a captured image from the unmanned flying object and displays the acquired captured image. The information processing device 20 acquires a captured image including the destination or the surrounding area of the destination which is captured by the imaging unit 55 disposed in the unmanned flying object 50 and then performs step ST6.

In step ST6, the information processing device acquires surrounding information. The information processing device 20 performs subject recognition using the captured image acquired from the unmanned flying object 50, acquires the surrounding information indicating, for example, the number of persons or vehicles lined up in a facility of the destination, or the like, and then performs step ST7.

In step ST7, the information processing device determines whether the destination is congested. The information processing device 20 determines, for example, a congestion situation of the facility of the destination on the basis of the surrounding information acquired in step ST6, performs step ST8 in a case where it is determined that the destination is congested, and performs step ST9 in a case where it is determined that the destination is not congested.

In step ST8, the information processing device executes movement control. The information processing device 20 assumes that a waiting time for using the facility of the destination or the like becomes longer because the destination is congested. Accordingly, the information processing device performs adjustment of a traveling speed, change of a traveling route, or the like such that the vehicle avoids the congested state and arrives at the destination, and then performs step ST9.

In step ST9, the information processing device determines whether use of the unmanned flying object has ended. The information processing device 20 performs step ST10, for example, in a case where confirmation of the congestion situation of the destination is completed and use of the unmanned flying object 50 ends, and repeats step ST5 in a case where monitoring of the congestion situation of the destination is continuously performed to confirm change of the congestion situation.

In step ST10, the information processing device performs a process of ending use of the unmanned flying object. The information processing device 20 controls the unmanned flying object 50 such that the unmanned flying object 50 returns to a housing point.

According to this first operation example, since a congestion situation of a destination can be confirmed before arriving at the destination, it is possible to reduce a useless waiting time and the like and to improve convenience when using a facility of a destination or the like.

In addition, the information processing device 20 may display a captured image captured by the imaging unit 55 of the unmanned flying object 50 on the display unit 22 until arriving at the destination. When the captured image is displayed in this way, an occupant of the vehicle can sequentially observe the situation of the destination or the surrounding area of the destination. In addition, the information processing device 20 may display guidance information regarding the destination on the display unit 22. When guidance information is displayed in this way, an occupant of the vehicle can acquire information regarding the destination beforehand. The information processing device 20 performs such image display such that the occupant can effectively use the time until arriving at the destination.

In addition, when the unmanned flying object is caused to generate a captured image depending on the arrangement or the display size of the display unit 22, the information processing device 20 can optimally display a captured image of the destination or the surrounding area thereof. For example, in a case where the information processing device 20 is provided in a bike, the information processing device 20 acquires a captured image of a front view in the moving direction of the unmanned flying object 50 from the unmanned flying object 50 to correspond to the display unit 22 disposed in front of a driver and displays the acquired captured image on the display unit 22. In addition, the captured image acquired by the information processing device 20 is set to an image size depending on the number of display pixels of the display unit 22. According to this configuration, it is possible to optimally display a captured image in the moving direction of the unmanned flying object 50 on the display unit 22. In addition, in a case where the information processing device 20 is provided in a vehicle, the information processing device 20 acquires captured images obtained by imaging the surroundings of the unmanned flying object 50 from the unmanned flying object 50 and displays the acquired captured images on the display unit 22 depending on the arrangement or the display size of the display unit 22 disposed in the vehicle. For example, the information processing device 20 displays a captured image in the moving direction of the unmanned flying object 50 on the display unit 22 located on the front side of the vehicle and displays a captured image on the right side in the moving direction of the unmanned flying object 50 on the display unit 22 located on the right side of the vehicle. In addition, captured images in the corresponding directions are displayed on other display units. By performing this display, the information processing device 20 can optimally display images as if an occupant of the vehicle boarded the unmanned flying object 50.

3-2. Second Operation Example

Next, an example in a case where an information providing system is used for parking will be described below as a second operation example. In the second operation example, convenience when using a parking lot is improved by detecting an empty space on the basis of a captured image of the parking lot captured by an unmanned flying object and performing movement guidance to the detected empty space using the unmanned flying object. Incidentally, the information processing device is provided in a vehicle as a configuration unified with the vehicle or a configuration carried by an occupant of the vehicle.

Figure 7:
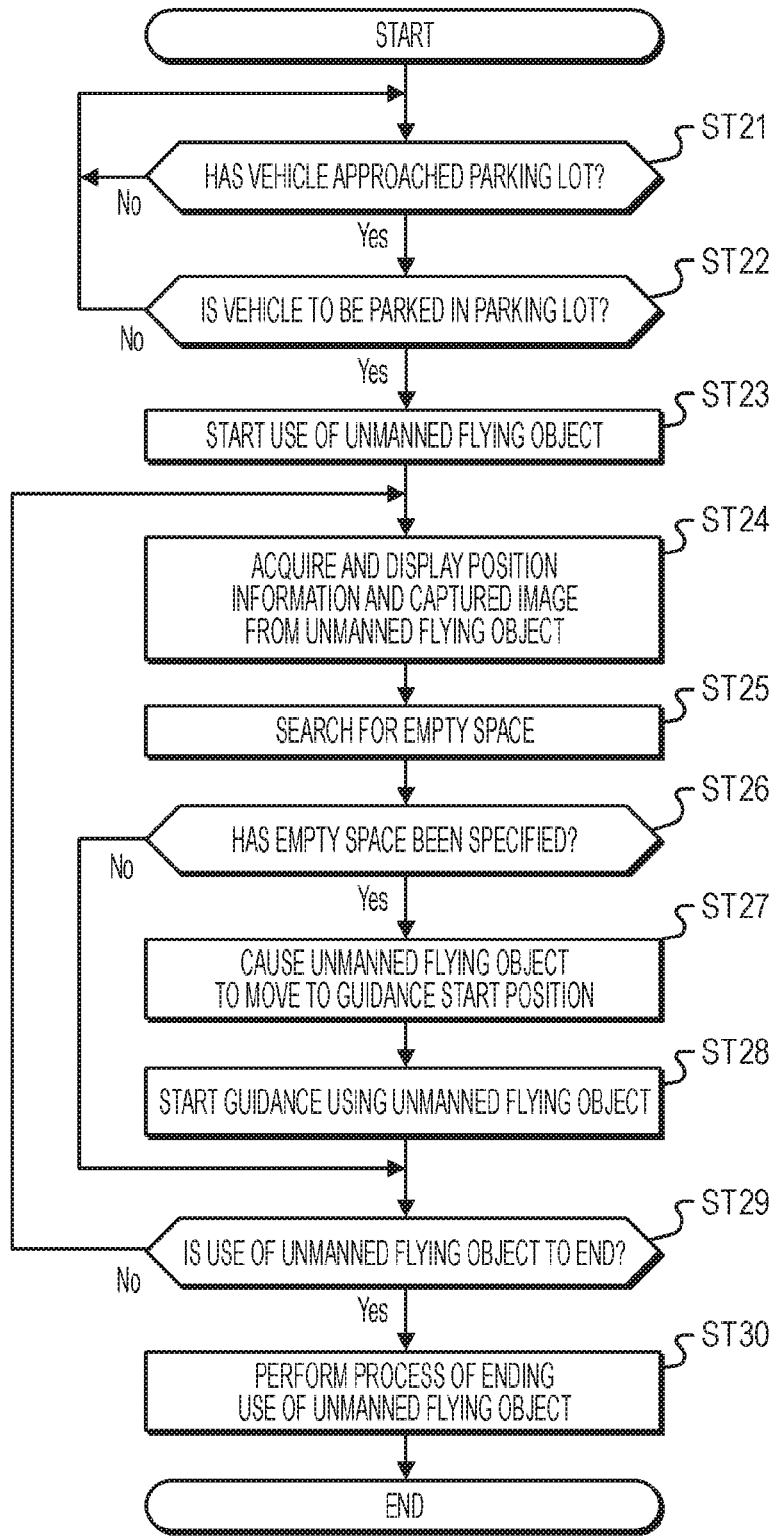
FIG. 7 is a flowchart illustrating a second operation example.

FIG. 7 is a flowchart illustrating the second operation example. In step ST21, the information processing device determines whether the vehicle has approached a parking lot. The information processing device 20 determines whether the vehicle has approached the parking lot on the basis of position information and map information. The information processing device 20 performs step ST22 in a case where it is determined that the vehicle has approached the parking lot, and repeats step ST21 in a case where it is determined that the vehicle has not approached the parking lot.

In step ST22, the information processing device determines whether the vehicle is to be parked in the parking lot. The information processing device 20 performs step ST23 in a case where it is determined that a user has been instructed to park the vehicle in the approached parking lot, and repeats step ST21 in a case where it is determined that the user has not been instructed to park the vehicle.

Figure 8:
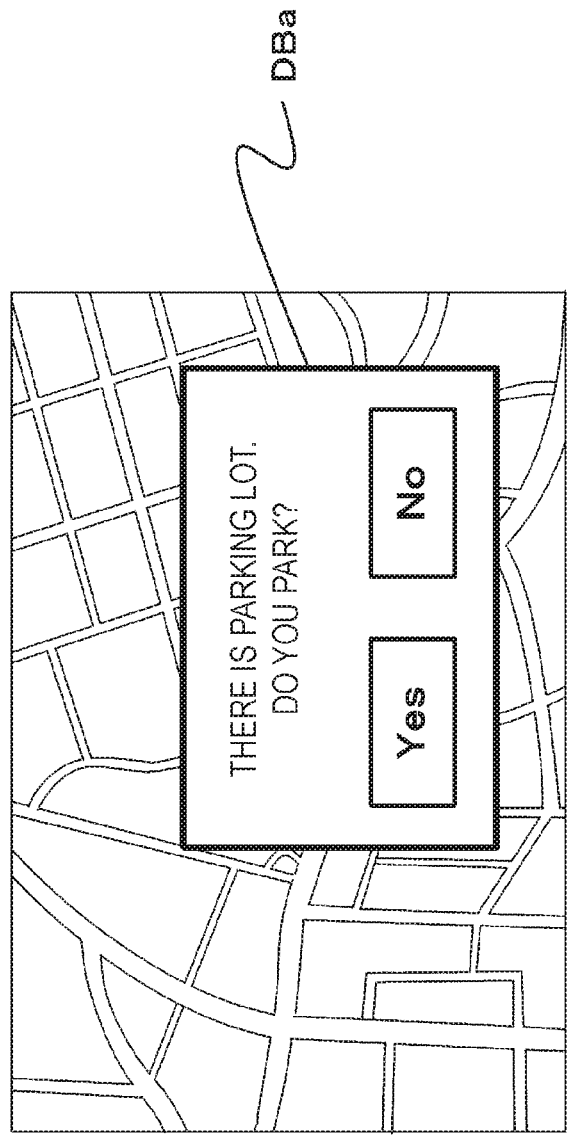
FIG. 8 is a diagram illustrating a user instruction input screen for use of a parking lot.

FIG. 8 illustrates a user instruction input screen for use of a parking lot. The information processing device 20 displays a dialog box DBa on the display unit 22. In the dialog box DBa, an instruction button "Yes" in a case where the vehicle is to be parked in the parking lot and an instruction button "No" in a case where the vehicle is not to be parked in the parking lot are provided. The information processing device 20 detects which instruction button a user (an occupant) has operated and determines whether or not a user instruction indicating that the vehicle is to be parked has been given on the basis of the detection result.

Referring back to FIG. 7, in step ST23, the information processing device starts use of the unmanned flying object. The information processing device 20 starts flight control for the unmanned flying object 50, starts flight of the unmanned flying object 50 to the approached parking lot, and then performs step ST24.

In step ST24, the information processing device acquires position information and a captured image from the unmanned flying object and displays the acquired position information and the acquired captured image. The information processing device 20 acquires the position information from the position information acquiring unit 52 of the unmanned flying object 50. In addition, the information processing device 20 acquires the captured image from the imaging unit 55 of the unmanned flying object 50. In addition, the information processing device 20 displays the flight position of the unmanned flying object 50 and the captured image on the display unit 22 on the basis of the acquired position information and then performs step ST25.

In step ST25, the information processing device searches for an empty space. The information processing device 20 performs image processing using the captured image acquired in step ST24 and searches for an empty space in which no vehicle is parked. For example, the information processing device 20 performs subject recognition or the like to determine vehicles and parking spaces, detects an empty space on the basis of determination results, and then performs step ST26.

In step ST26, the information processing device determines whether an empty space has been specified. The information processing device determines whether an empty space in which the vehicle is to be parked has been specified. The information processing device 20 performs step ST29 in a case where an empty space has not been specified because an empty space has not been detected and in a case where a user instruction indicating that a detected empty space is not to be used has been given. In addition, the information processing device 20 performs step ST27 in a case where an empty space has been specified. An empty space may be specified by a user or an empty space may be automatically specified. In a case where an empty space is specified by a user, the information processing device 20 displays detected empty spaces on the display unit 22 and sets an empty space selected in response to a user input from the input unit 21 as a specified empty space. In addition, in a case where an empty space is automatically specified, the information processing device 20 sets a widest empty space or an empty space close to an entrance or exit as a specified empty space.

Figure 9:
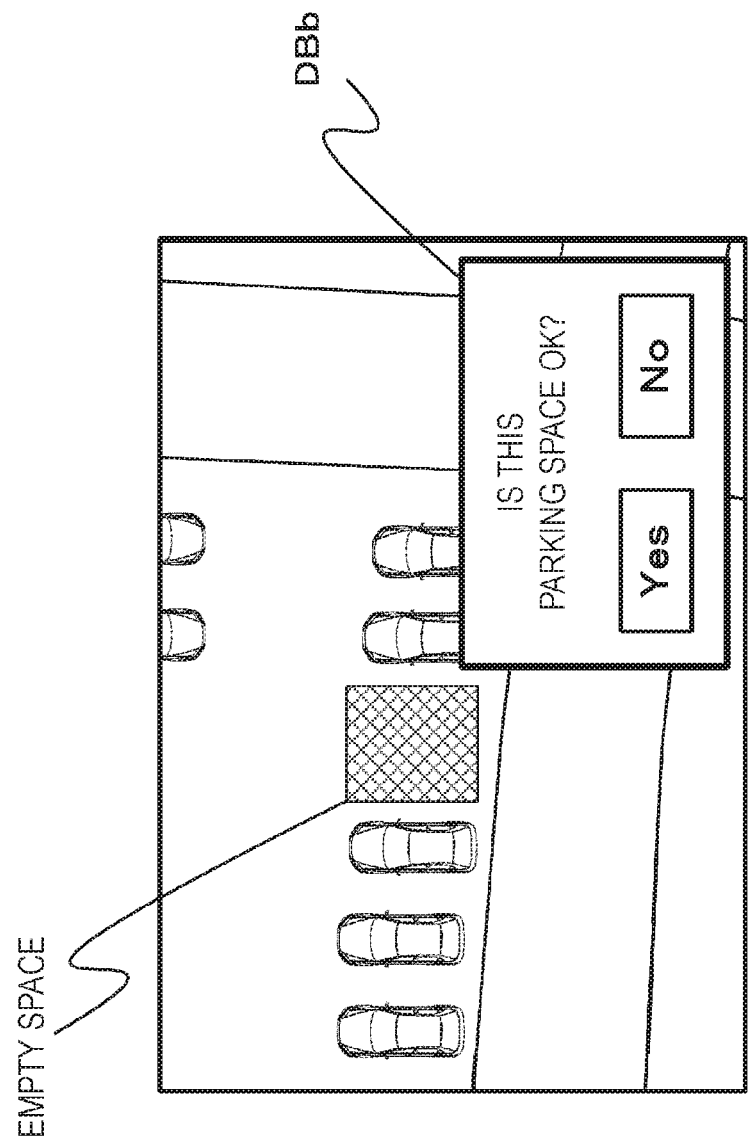
FIG. 9 is a diagram illustrating a screen for an operation of specifying an empty space.

FIG. 9 illustrates a screen for an operation of specifying an empty space. The information processing device 20 displays a dialog box DBb on the display unit 22. In the dialog box DBb, an instruction button "Yes" in a case where the vehicle is to be parked in the detected empty space and an instruction button "No" in a case where the vehicle is not to be parked in the detected empty space are provided. The information processing device 20 detects which instruction button a user has operated and determines whether or not an empty space in which the vehicle is to be parked has been specified on the basis of the detection result. Incidentally, the information processing device 20 may display a captured image of the detected empty space on the screen for the operation of specifying an empty space. When a captured image of the detected empty space is displayed in this way, the user can appropriately determine whether or not the vehicle is to be parked in the empty space on the basis of the captured image of the empty space.

Referring back to FIG. 7, in step ST27, the information processing device causes the unmanned flying object to move to a guidance start position. The information processing device 20 causes the unmanned flying object 50 to move to the guidance start position, for example, a position of the vehicle or a nearby position which is visually recognizable from the vehicle, and then performs step ST28.

In step ST28, the information processing device starts guidance using the unmanned flying object. The information processing device 20 guides the vehicle to the empty space by setting the position of the specified empty space in the unmanned flying object 50 and then causing the unmanned flying object 50 to move from the guidance start position to the position of the specified empty space, and then performs step ST29.

In step ST29, the information processing device determines whether use of the unmanned flying object has ended. The information processing device 20 performs step ST30 in a case where the vehicle has moved to the position of the specified empty space or in a case where parking of the vehicle in the specified empty space has been completed and use of the unmanned flying object 50 ends, and repeats step ST24 in a case where the unmanned flying object 50 is continuously to be used.

In step ST30, the information processing device performs a process of ending use of the unmanned flying object. The information processing device 20 controls the unmanned flying object 50 such that the unmanned flying object 50 returns to the housing point.

According to this second operation example, it is possible to easily find an empty space using a captured image acquired by the unmanned flying object 50. In addition, since guidance to the specified empty space can be performed using the unmanned flying object 50, it is possible to rapidly park the vehicle. Accordingly, it is possible to improve convenience when using a parking lot.

3-3. Third Operation Example

Next, a case where an information providing system is used for route search will be described as a third operation example. In the third operation example, the information processing device 20 searches for a movement route inside a destination on the basis of a captured image of the inside of the destination obtained by causing the unmanned flying object 50 to move and to image the inside of the destination. In addition, the information processing device 20 starts movement of a small-size moving object from a vehicle 40 along a set movement route by setting the detected movement route in a moving object which is used for movement in the destination.

Figure 10:
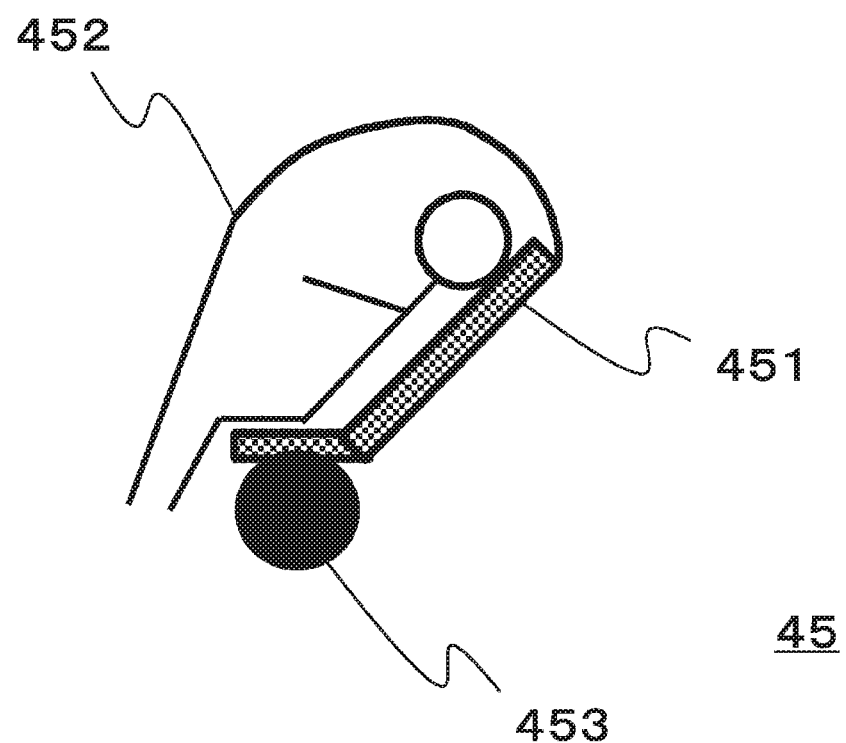
FIG. 10 is a diagram illustrating a small-size moving object.

FIG. 10 illustrates a small-size moving object. A small-size moving object 45 has a canopy 452 provided on the front side of a seat 451. The canopy 452 employs, for example, a flexible display and is configured to present a variety of information to a person who sits on the seat 451. In addition, the canopy 452 is configured in a receptive manner. A running unit 453 is attached to the seat 451. In the running unit 453, a position information acquiring unit, a running drive unit, a control unit, a power supply unit, and the like are provided. The position information acquiring unit acquires a current location of the small-size moving object. The running drive unit includes a drive motor, a tire, and the like and causes the small-size moving object to run. The control unit executes drive control of the running drive unit on the basis of the current location acquired by the position information acquiring unit or map information such that the small-size moving object runs along the set movement route. In addition, receipt of the canopy 452 or display of information using the canopy 452 is performed.

Figure 11A:
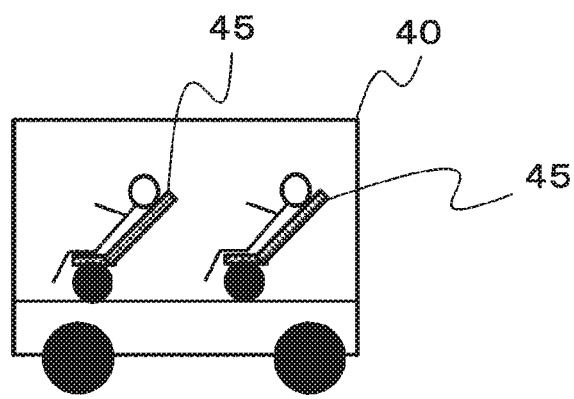
FIGS. 11A and 11B are diagrams illustrating a vehicle and a small-size moving object.
Figure 11B:
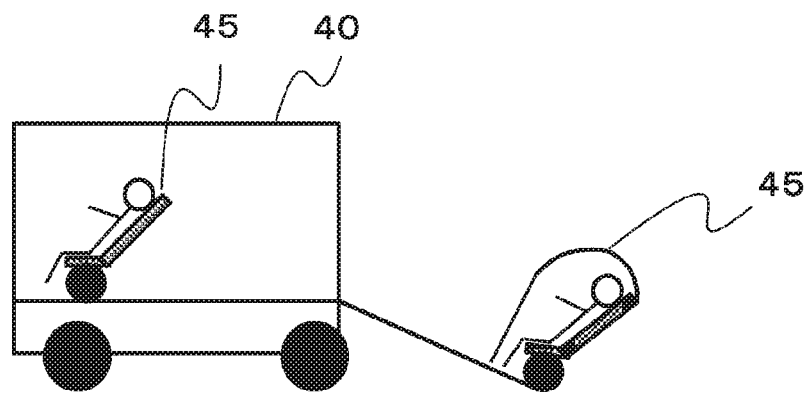

FIGS. 11A and 11B illustrate a vehicle and small-size moving objects, where FIG. 11A illustrates a case where small-size moving objects 45 are stored in the vehicle 40. In a case where each small-size moving object 45 is stored in the vehicle 40, the small-size moving object 45 is used as a seat in the vehicle and the canopy 452 is in a received state. In addition, in a case where the small-size moving object 45 starts movement from the vehicle 40 along the set movement route, the canopy 452 is located at the front position of the seat 451 as illustrated in FIG. 11B and displays a variety of information associated with the movement route, sightseeing points, or the like. Incidentally, FIG. 11B illustrates a case where the small-size moving object 45 is taken out of a rear portion of the vehicle 40, but the small-size moving object 45 may be taken out of a front portion or a lateral portion of the vehicle 40.

Figure 12:
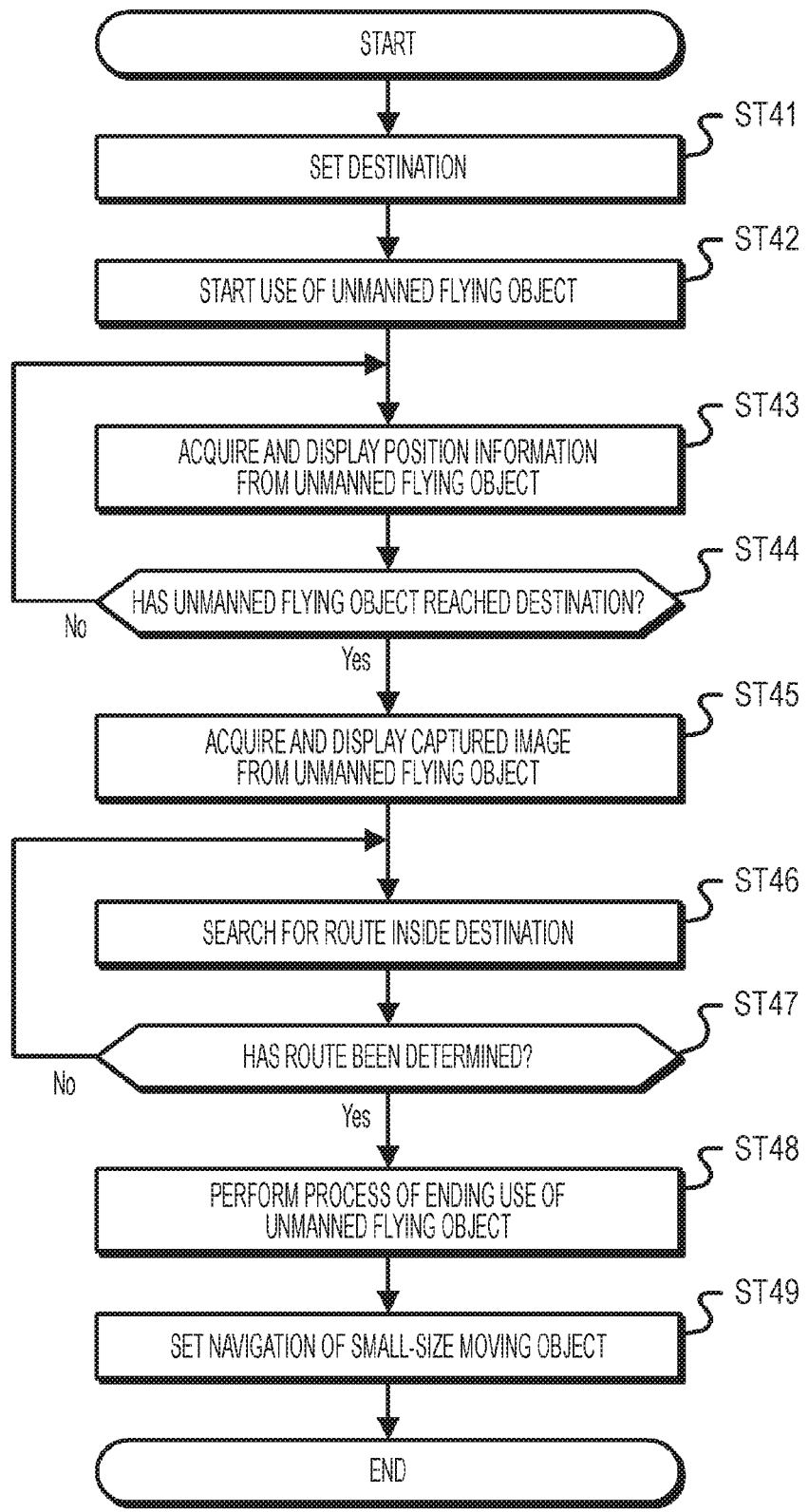
FIG. 12 is a flowchart illustrating a third operation example.

FIG. 12 is a flowchart illustrating the third operation example and illustrates a process routine until a movement route is set in a small-size moving object 45.

In step ST41, the information processing device sets a destination. The information processing device 20 sets the destination set by a user in an unmanned flying object 50 and performs step ST42.

In step ST42, the information processing device starts use of the unmanned flying object. The information processing device 20 starts flight control by communication with the unmanned flying object 50, causes the unmanned flying object 50 to fly to the set destination, and then performs step ST43.

In step ST43, the information processing device acquires position information from the unmanned flying object and displays the acquired position information. The information processing device 20 acquires the position information from the position information acquiring unit 52 of the unmanned flying object 50. In addition, the information processing device 20 displays a flight position of the unmanned flying object 50 on the display unit 22 on the basis of the acquired position information and then performs step ST44.

In step ST44, the information processing device determines whether the unmanned flying object has reached the destination. The information processing device 20 performs step ST45 in a case where the position information acquired from the unmanned flying object 50 indicates the position of the destination, and repeats step ST43 in a case where the position information does not indicate the position of the destination.

In step ST45, the information processing device acquires a captured image from the unmanned flying object and displays the acquired captured image. The information processing device 20 causes the imaging unit 55 disposed in the unmanned flying object 50 to image the destination. In addition, the information processing device 20 acquires a captured image generated by the unmanned flying object 50 and then performs step ST46.

In step ST46, the information processing device performs route search inside the destination. The information processing device 20 performs subject recognition using the captured image obtained by causing the unmanned flying object 50 to image the inside of the destination from the sky and determines arrangement of buildings, passage conditions, obstacles, and the like inside the destination. In addition, the information processing device 20 searches for a movement route through which a small-size moving object which will be described later can pass on the basis of the determination result and then performs step ST47. Incidentally, in a case where it rains or in a case where a rainfall is expected on the basis of the detection result from the vehicle-outside information detecting unit 28, a rain avoiding spot such as a building or under a tree may be searched for and a movement route which is less wet may be searched for.

In step ST47, the information processing device determines whether a route has been determined. The information processing device 20 performs step ST48 in a case where a movement route through which a small-size moving object can pass has been determined in the destination, and repeats step ST46 in a case where a movement route has not been determined.

Figure 13:
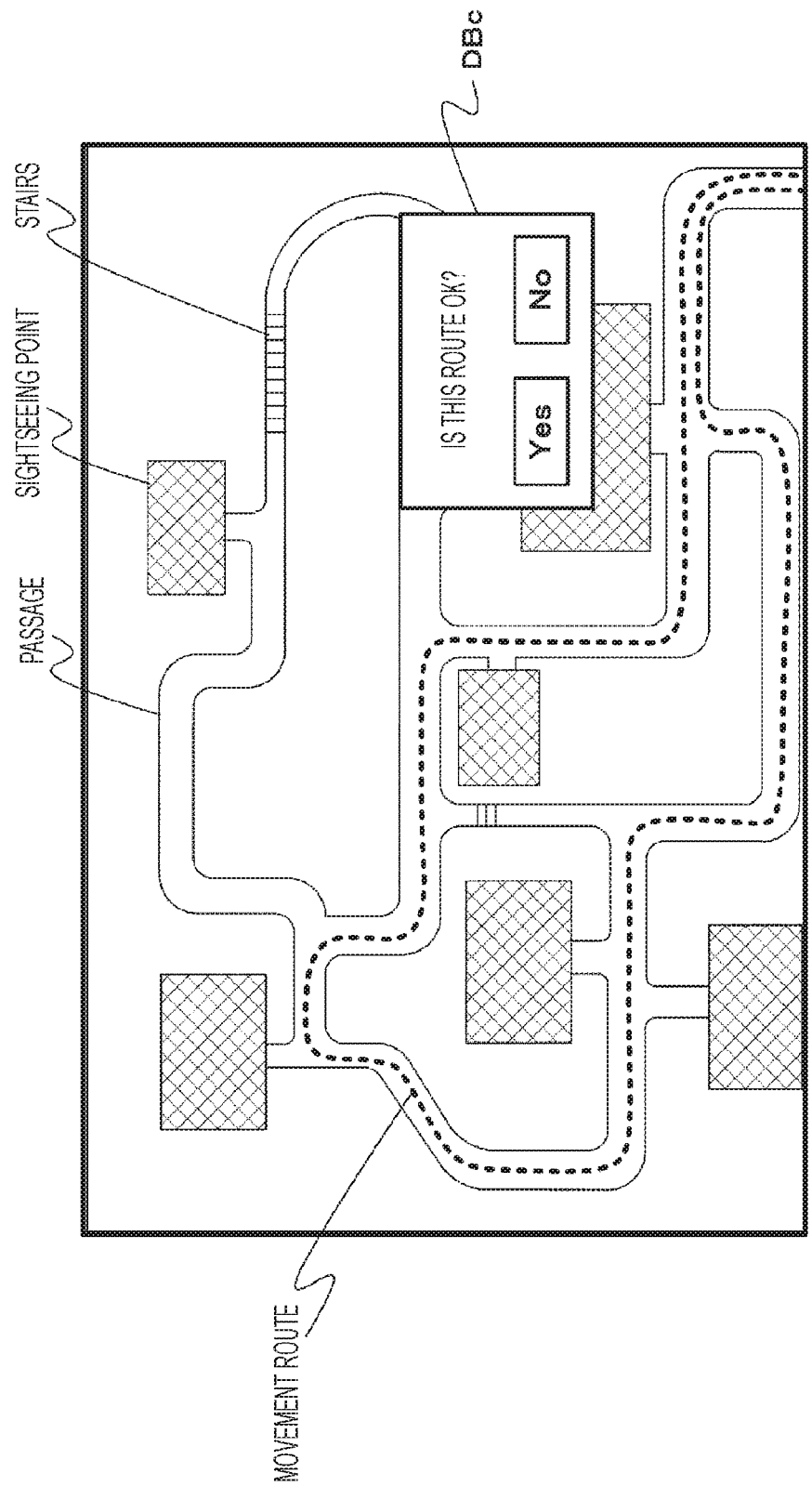
FIG. 13 is a diagram illustrating a user instruction input screen for determination of a route.

FIG. 13 illustrates a user instruction input screen for determination of a route. The information processing device 20 displays a dialog box DBc on the display unit 22. In the dialog box DBc, an instruction button "Yes" in a case where a searched-for route is to be employed and an instruction button "No" in a case where a searched-for route is not to be employed are provided. The information processing device 20 detects which instruction button a user has operated and determines whether or not a route has been determined on the basis of the detection result. Incidentally, in the user instruction input screen for determination of a route, for example, a route image (a dotted line) indicating the searched-for route is superimposed on the captured image indicating the inside of a facility of the destination and how a small-size moving object is scheduled to move inside the facility of the destination is clearly displayed.

Referring back to FIG. 12, in step ST48, the information processing device performs a process of ending use of the unmanned flying object. The information processing device 20 controls the unmanned flying object 50 such that the unmanned flying object 50 returns to the housing point, and then performs step ST49.

In step ST49, the information processing device performs setting of a navigation in a small-size moving object. The information processing device 20 sets the navigation of the small-size moving object such that the small-size moving object can move along the movement route determined in step ST47.

According to this third operation example, in a case where a user moves inside a destination using a small-size moving object, a movement route is determined in advance and thus it is possible to improve convenience when using a facility of the destination or the like. In addition, the small-size moving object 45 separated from the vehicle 40 performs automatic driving along the set movement route and thus it is possible to facilitate sightseeing or the like. Incidentally, in the third operation example, a case where a small-size moving object is used has been described, but in a case where a user moves on foot, a route in which the user can move on foot is searched for and an information terminal device carried by the user moving on foot is notified of the movement route.

3-3. Fourth Operation Example

Next, a case where an information processing device is switched for use will be described as a fourth operation example. For example, a case where an information processing device incorporated into a vehicle executes control of an unmanned flying object and a control authority over the unmanned flying object is switched to, for example, an information terminal device carried by an occupant in a case where the occupant (a user) gets off the vehicle will be described. Incidentally, in the following description, an information processing device incorporated into a vehicle is referred to as a vehicle information processing device 20c and, for example, an information terminal device carried by an occupant for control of an unmanned flying object is referred to as a portable information processing device 20p.

Figure 14:
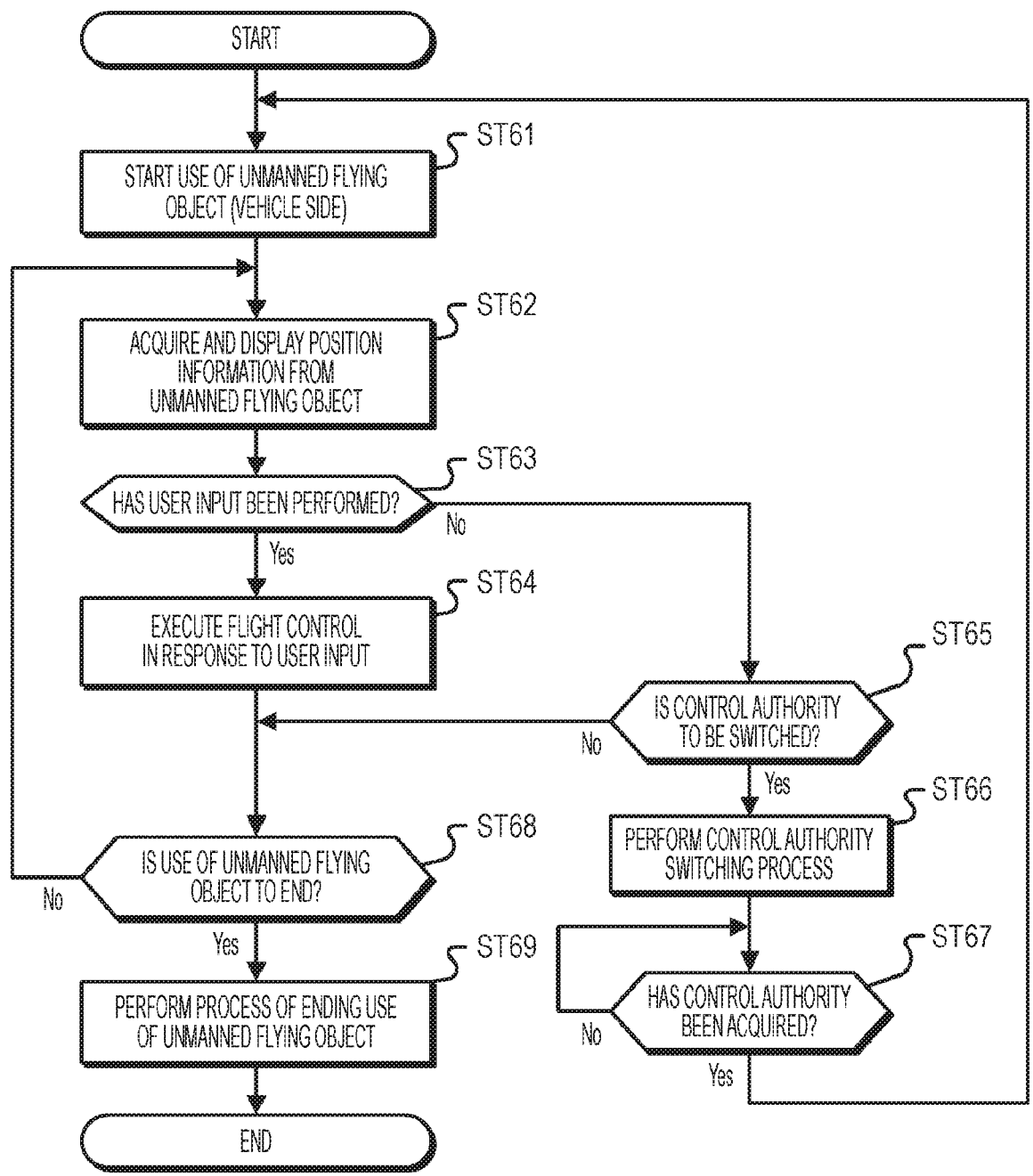
FIG. 14 is a flowchart illustrating a fourth operation example (an operation example of a vehicle information processing device).
Figure 17:
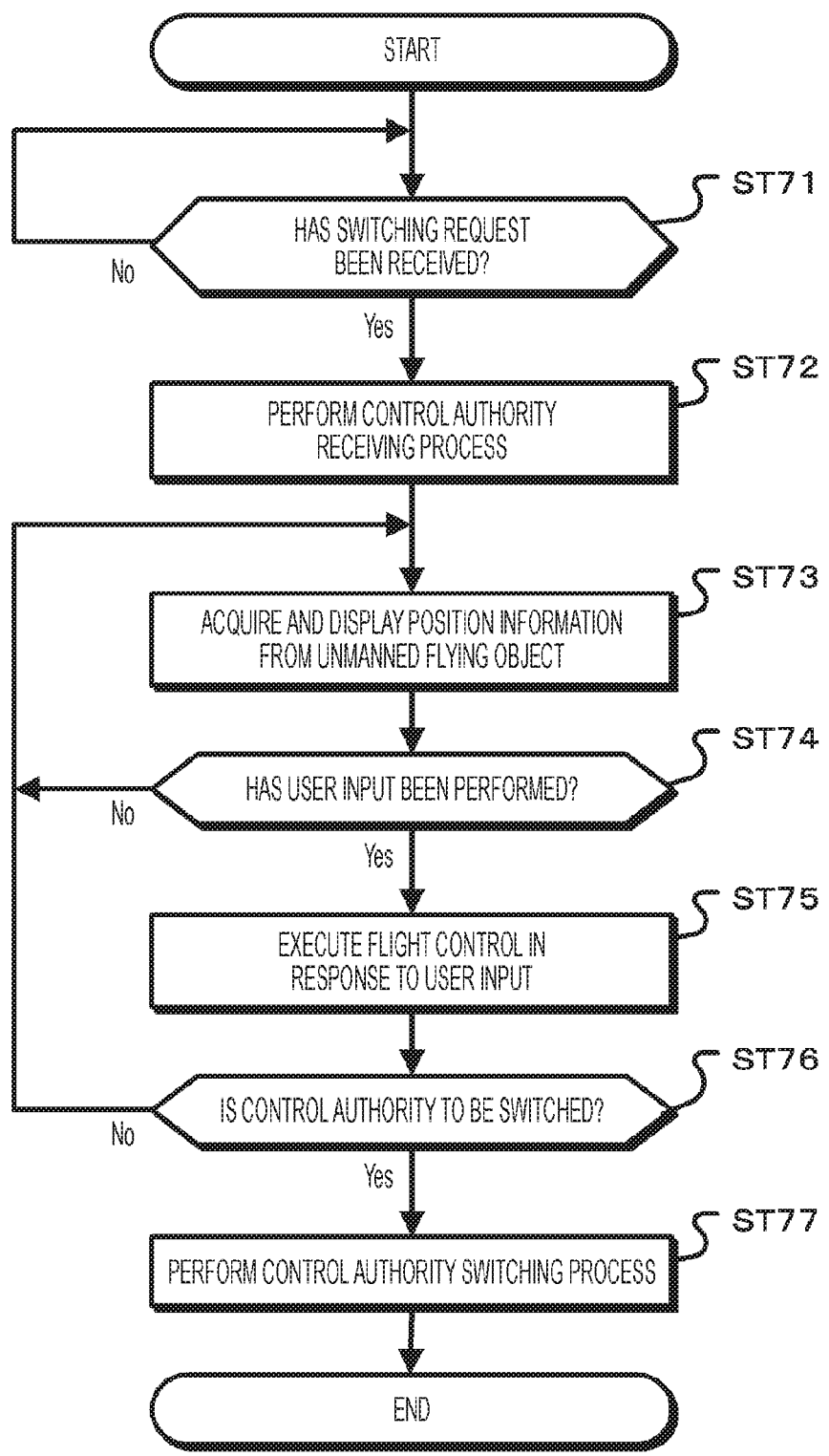
FIG. 17 is a flowchart illustrating the fourth operation example (an operation example of a portable information processing device).

FIGS. 14 and 17 are flowcharts illustrating the fourth operation example. Incidentally, FIG. 14 illustrates an operation example of a vehicle information processing device, and FIG. 17 illustrates an operation example of a portable information processing device. In step ST61 of FIG. 14, the vehicle information processing device starts use of an unmanned flying object. The vehicle information processing device 20c starts flight control by communication with the unmanned flying object 50, causes the unmanned flying object 50 to fly, and then performs step ST62.

In step ST62, the vehicle information processing device acquires position information from the unmanned flying object and displays the acquired position information. The vehicle information processing device 20c acquires the position information from the position information acquiring unit 52 of the unmanned flying object 50. In addition, the vehicle information processing device 20c displays a flight position or the like of the unmanned flying object 50 on the display unit 22 on the basis of the acquired position information and then performs step ST63.

Figure 15:
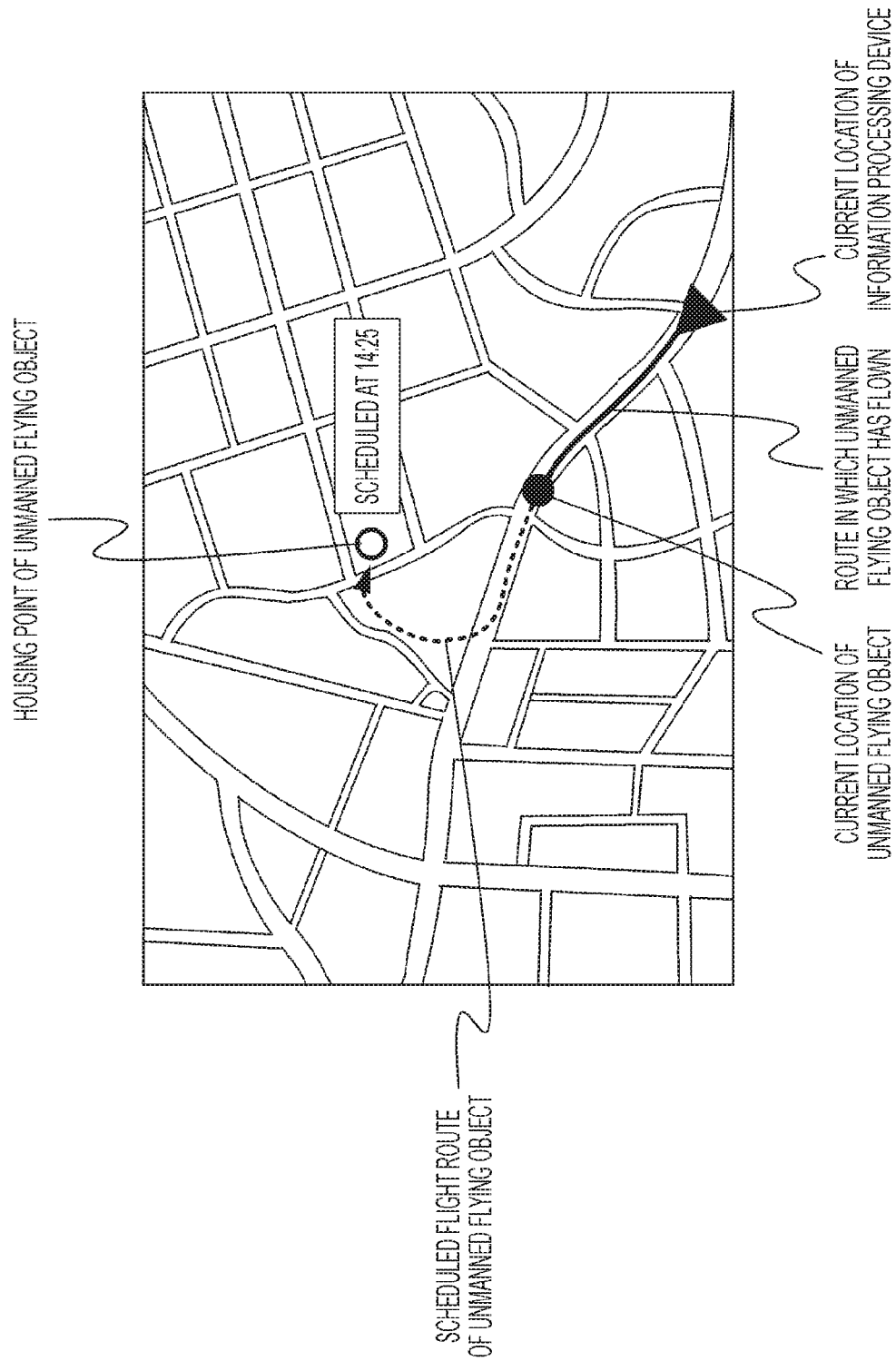
FIG. 15 is a diagram illustrating display of a flight position of an unmanned flying object.

FIG. 15 illustrates display of a flight position of an unmanned flying object. In display of the flight position, for example, a housing point and a scheduled arrival time of the unmanned flying object, a position of the unmanned flying object 50, a route in which the unmanned flying object 50 has flown, a scheduled flight route, and a position of the information processing device 20 (the vehicle) are displayed on a map. Incidentally, information of the scheduled flight route is stored in the information storage unit 30. In addition, by allowing a user to change the scheduled flight route, the user may cause the unmanned flying object 50 to fly to the housing point of the unmanned flying object along a route desired by the user.

Referring back to FIG. 14, in step ST63, the vehicle information processing device determines whether a user input has been performed. The vehicle information processing device 20c performs step ST64 in a case where it is determined that a user input has been performed, and performs step ST65 in a case where it is determined that a user input has not been performed.

In step ST64, the vehicle information processing device executes flight control in response to a user input. The vehicle information processing device 20c generates a control signal such that an operation based on the user input is performed by the unmanned flying object 50, transmits the generated control signal to the unmanned flying object 50, and then performs step ST68.

When the process routine transitions from step ST63 to step ST65, the vehicle information processing device determines whether a control authority is to be switched. The vehicle information processing device 20c determines that an occupant is to get off the vehicle and displays a control authority switching instruction screen, for example, in a case where the vehicle 40 stops and it is detected that opening of a door, stopping of an engine, or the like has been performed.

Figure 16:
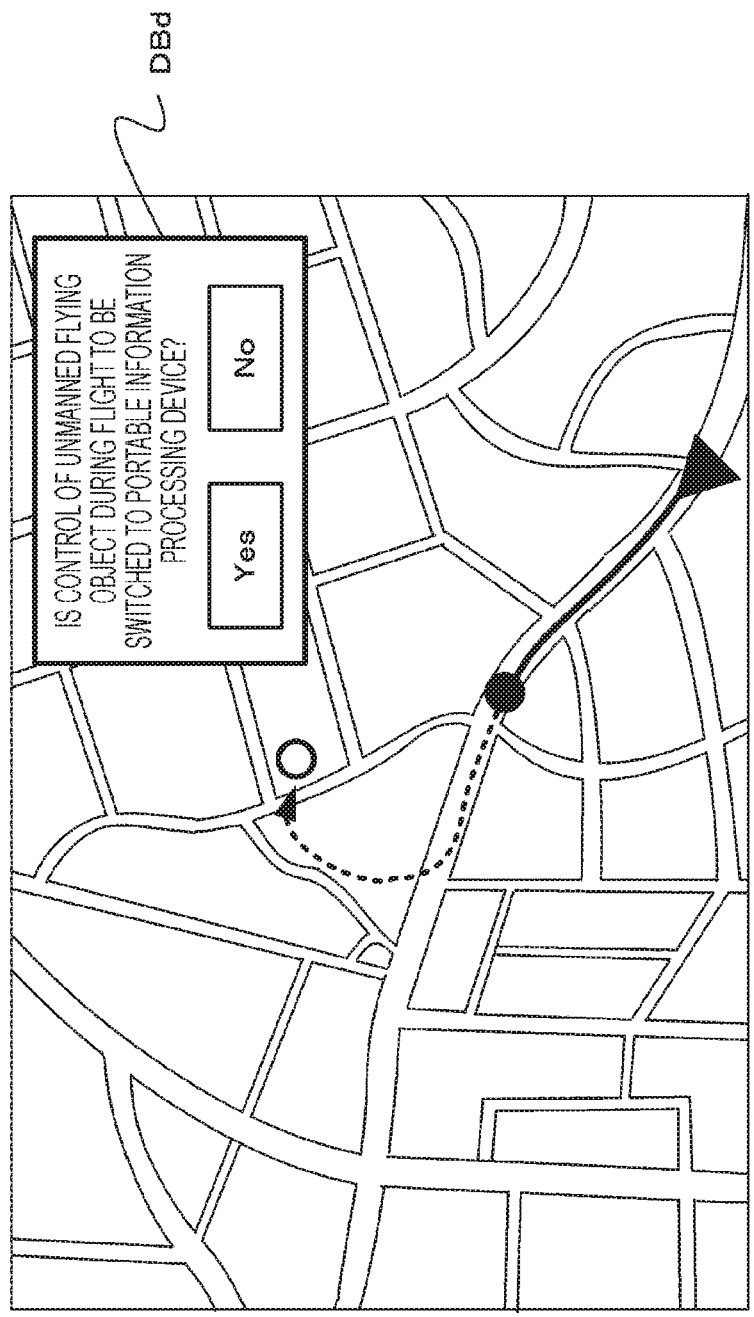
FIG. 16 is a diagram illustrating a control authority change instruction screen.

FIG. 16 illustrates a control authority switching instruction screen. The information processing device 20 displays a dialog box DBd on the display unit 22. In the dialog box DBd, an instruction button "Yes" in a case where control of the unmanned flying object during flight is switched to a portable information processing device and an instruction button "No" in a case where the control is not switched are provided. The vehicle information processing device 20c detects which instruction button the user has operated and determines whether or not the control authority is to be switched on the basis of the detection result.

The vehicle information processing device 20c performs step ST66 in a case where it is determined that the control authority is to be switched, and performs step ST68 in a case where it is determined that the control authority is not to be switched.

In step ST66, the vehicle information processing device performs a control authority switching process. The vehicle information processing device 20c communicates with the portable information processing device 20p and transmits a switching request for flight control to the portable information processing device 20p. Incidentally, the switching request for flight control includes information which is required for continuously executing flight control. The vehicle information processing device 20c ends flight control of the unmanned flying object 50 in response to reception of a permission notification in response to the switching request for flight control and then performs step ST67.

In step ST67, the vehicle information processing device determines whether the control authority is to be acquired. In a case where a switching request for flight control has been transmitted from the portable information processing device 20p, the vehicle information processing device 20c determines that the control authority is to be acquired, transmits a permission notification in response to the switching request for flight control to the portable information processing device 20p, and then repeats step ST61. In addition, the vehicle information processing device 20c repeats step ST67 in a case where a switching request for flight control has not been transmitted. In addition, the vehicle information processing device 20c may acquire the control authority in response to detection of boarding of a user. In this case, the vehicle information processing device 20c requests the portable information processing device 20p for the control authority and acquires information which is required for continuously executing flight control.

In step ST68, the vehicle information processing device determines whether use of the unmanned flying object is to end. The vehicle information processing device 20c performs step ST69 in a case where use of the unmanned flying object 50 ends because the purpose has been achieved using the unmanned flying object 50, and repeats step ST62 in a case where the unmanned flying object 50 is to be continuously used.

In step ST69, the vehicle information processing device performs a process of ending use of the unmanned flying object. The vehicle information processing device 20c controls the unmanned flying object 50, returns the unmanned flying object 50 to a predetermined position, and ends the operation thereof.

FIG. 17 illustrates the operation of the portable information processing device, where the portable information processing device determines whether a switching request has been received in step ST71. The portable information processing device 20p performs step ST72 in a case where the switching request for flight control has been received from the vehicle information processing device 20c, and repeats step ST71 in a case where the switching request has not been received.

In step ST72, the portable information processing device performs a control authority receiving process. The portable information processing device 20p transmits a permission notification in response to the switching request for flight control to the vehicle information processing device 20c. In addition, the portable information processing device 20p starts flight control of the unmanned flying object 50 using information included in the switching request. For example, the portable information processing device 20p starts an application for executing flight control of the unmanned flying object 50 in response to the switching request for flight control from the vehicle information processing device 20c, starts control of the unmanned flying object 50, and then performs step ST73.

In step ST73, the portable information processing device acquires position information from the unmanned flying object and displays the acquired position information. The portable information processing device 20p acquires the position information from the position information acquiring unit 52 of the unmanned flying object 50. In addition, the portable information processing device 20p displays a flight position of the unmanned flying object 50 or the like on the display unit on the basis of the acquired position information and then performs step ST74.

Figure 18:
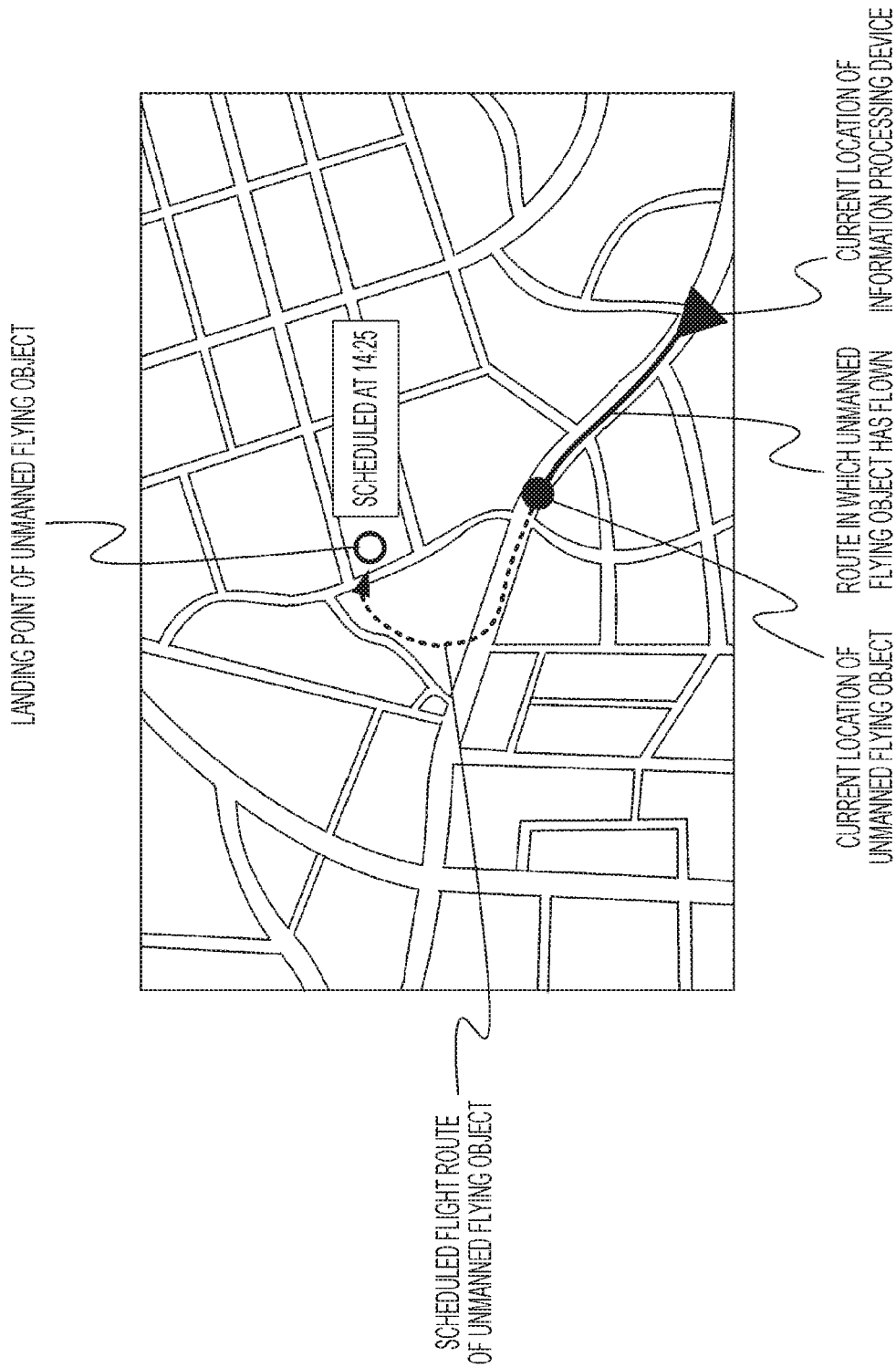
FIG. 18 is a diagram illustrating display of a flight position of an unmanned flying object.

FIG. 18 illustrates display of a flight position of an unmanned flying object. In display of the flight position, for example, a landing point and a scheduled arrival time of the unmanned flying object, a position of the unmanned flying object 50, a route in which the unmanned flying object 50 has flown, a scheduled flight route, and a position of the information processing device 20 (the vehicle) are displayed on a map. Incidentally, information of the scheduled flight route is stored in the information storage unit 30. In addition, a user may change the scheduled flight route and may cause the unmanned flying object 50 to fly to the housing point of the unmanned flying object along a route desired by the user. In a case where the flight position of the unmanned flying object is displayed by the portable information processing device in this way, the housing point of the unmanned flying object in the configuration in which the unmanned flying object 50 is housed in the vehicle 40 is a landing point of the unmanned flying object for the use of the portable information processing device. Accordingly, the housing point of the unmanned flying object illustrated in FIG. 15 is displayed as a landing point of the unmanned flying object in FIG. 18.

Referring back to FIG. 17, in step ST74, the portable information processing device determines whether a user input has been performed. The portable information processing device 20p performs step ST75 in a case where it is determined that a user input has been performed, and repeats step ST73 in a case where it is determined that a user input has not been performed.

In step ST75, the portable information processing device executes flight control in response to the user input. The portable information processing device 20p generates a control signal such that an operation based on the user input is performed by the unmanned flying object 50, transmits the generated control signal to the unmanned flying object 50, and then performs step ST76.

In step ST76, the portable information processing device determines whether a control authority is to be switched. The portable information processing device 20p determines that the control authority is to be switched in a case where an operation of switching the control authority to the vehicle information processing device 20c has been performed on the basis of the user input or in a case where a request for the control authority has been transmitted from the vehicle information processing device 20c, and then performs step ST77. In addition, the portable information processing device 20p repeats step ST73 in a case where an operation of switching the control authority or the request for the control authority has not been performed.

In step ST77, the portable information processing device performs the control authority switching process. The portable information processing device 20p communicates with the vehicle information processing device 20c and transmits a switching request for flight control. Incidentally, the switching request for flight control includes information which is required for continuously executing flight control. In addition, the portable information processing device 20p transmits a request permission notification including the information which is required for continuously executing flight control to the vehicle information processing device 20c in response to the request for the control authority from the vehicle information processing device 20c.

According to this fourth operation example, even when a user gets off a vehicle or even when the user gets on the vehicle, control of an unmanned flying object or acquisition of a captured image can be performed and thus it is possible to improve convenience when using a destination.

A series of processes described in this specification can be performed in hardware, in software, or in combination thereof. In a case where the processes are performed in software, a program having a processing sequence recorded thereon is installed in a memory of a computer which is taken into dedicated hardware and is executed. Alternatively, a program can be installed and executed in a general-purpose computer which can performed various processes.

For example, a program can be recorded in advance in a hard disk, a solid state drive (SSD), or a read only memory (ROM) as a recording medium. Alternatively, a program can be temporarily or permanently stored (recorded) in a removable recording medium such as a flexible disk, a compact disc read only memory (CD-ROM), a magneto-optical (MO) disc, a digital versatile disc (DVD), a Blu-Ray Disc (registered trademark) (BD), a magnetic disk, or a semiconductor memory card. Such a removable recording medium can be provided as so-called package software.

In addition, a program may be installed from the removable recording medium to the computer or may be transmitted to a computer from a download site via a network such as a local area network (LAN) or the Internet in a wireless or wired manner. The computer can receive the program which is transmitted in the above-mentioned manner and install the program in a recording medium such as a hard disk built therein.

Incidentally, the effects described in this specification are only examples and are not restrictive, and additional effects which have not been described above may be provided. In addition, the present technology should not be construed with limitation to the above-mentioned embodiments. The embodiments disclose the present technology in the form of examples, and it is obvious to those skilled in the art that the embodiments can be modified or substituted without departing from the gist of the present technology. That is, the appended claims should be referred to for determining the gist of the present technology.

Further, the information processing device according to the present technology can adopt the following configurations.

(1) An information processing device including a control unit configured to execute flight control of an unmanned flying object and movement control associated with a destination on the basis of a captured image of the destination or a surrounding area of the destination obtained by causing the unmanned flying object to move to the destination through the flight control and causing the unmanned flying object to image the destination.

(2) The information processing device according to (1), in which the information processing device is provided in a vehicle, and the control unit executes movement control of the vehicle to the destination on the basis of the captured image of the destination or the surrounding area of the destination.

(3) The information processing device according to (2), in which the control unit determines a congestion situation on the basis of the captured image of the destination or the surrounding area of the destination and executes movement control to the destination on the basis of a determination result of the congestion situation.

(4) The information processing device according to (3), in which the control unit controls a movement route or a speed of the vehicle on the basis of the determination result of the congestion situation such that an arrival time at the destination is adjusted.

(5) The information processing device according to any one of (1) to (4), in which the information processing device is provided in a vehicle, and the control unit sets a parking lot as the destination, retrieves an empty space on the basis of a captured image of the parking lot, and performs movement guidance to a detected empty space by causing the unmanned flying object to move to a position of the detected empty space.

(6) The information processing device according to (5), in which the control unit moves the unmanned flying object from a position of the vehicle to the position of the detected empty space.

(7) The information processing device according to any one of (1) to (6), in which the control unit retrieves a movement route in the destination on the basis of a captured image of an inside of the destination obtained by causing the unmanned flying object to move in the destination and imaging the inside of the destination.

(8) The information processing device according to (7), in which the control unit sets the movement route detected through the retrieval in a moving object which is used for movement in the destination.

(9) The information processing device according to any one of (1) to (8), in which the information processing device is provided in a vehicle, and the control unit changes a control authority over the flight control of the unmanned flying object to an information processing device of an occupant getting off the vehicle when the occupant gets off the vehicle.

(10) The information processing device according to (9), in which the control unit provides information which has been used for the flight control of the unmanned flying object to the information processing device of the occupant getting off the vehicle in the changing of the control authority.

(11) The information processing device according to any one of (1) to (10), in which the information processing device includes a display unit, and the control unit displays the captured image on the display unit.

(12) The information processing device according to (11), in which the control unit sets an imaging direction of the unmanned flying object depending on arrangement of the display unit.

(13) The information processing device according to (11) or 812), in which the control unit sets an image size of the captured image generated by the unmanned flying object according to an image display size on the display unit.

INDUSTRIAL APPLICABILITY

In the information processing device and the information processing method according to the present technology, flight control of an unmanned flying object and movement control associated with a destination on the basis of a captured image of a destination or a surrounding area of the destination obtained by causing the unmanned flying object to move to the destination through the flight control and causing the unmanned flying object to capture an image are executed by the control unit. Accordingly, it is possible to improve convenience when using a facility of a destination or the like. Therefore, the present technology is suitably applied to a navigation system.

REFERENCE SIGNS LIST

10 Information processing system
20 Information processing device
20c Vehicle information processing device
20p Portable information processing device
21 Input unit
22 Display unit
23 Position information acquiring unit
24 Communication unit
25 Control unit
26 Voice output unit
27 Vehicle-inside state detecting unit
28 Vehicle-outside information detecting unit
29 Vehicle state detecting unit
30 Information storage unit
40 Vehicle
45 Small-size moving object
50 Unmanned flying object
51 Communication unit
52 Position information acquiring unit
53 Flying object control unit
54 Drive unit
55 Imaging unit
56 Sensor unit
451 Seat
452 Canopy
453 Running unit

The invention claimed is:

1. A first information processing device, comprising:
a display unit; and
a control unit configured to:
execute flight control of an unmanned flying object;
control the unmanned flying object to move the unmanned flying object to a destination, wherein the unmanned flying object is moved based on the execution of the flight control;
set an imaging direction of the unmanned flying object based on an arrangement of the display unit of the first information processing device;
control the unmanned flying object to capture an image of one of the destination or a surrounding area of the destination, wherein the image of one of the destination or the surrounding area of the destination is captured based on the set imaging direction; and
execute movement control based on the captured image of one of the destination or the surrounding area of the destination.

2. The first information processing device according to claim 1, wherein
the first information processing device is in a vehicle, and
the control unit is further configured to execute movement control of the vehicle to the destination based on the captured image of one of the destination or the surrounding area of the destination.

3. The first information processing device according to claim 2, wherein the control unit is further configured to:
   determine a congestion situation based on the captured image of one of the destination or the surrounding area of the destination; and
   execute the movement control of the vehicle to the destination based on the determined congestion situation.

4. The first information processing device according to claim 3, wherein
   the control unit is further configured to control at least one of a movement route or a speed of the vehicle to adjust an arrival time of the vehicle at the destination, and
   at least one of the movement route or the speed of the vehicle is controlled based on the determined congestion situation.

5. The first information processing device according to claim 1, wherein
   the first information processing device is in a vehicle,
   the control unit is further configured to set a parking lot as the destination of the vehicle, and
   the control unit is further configured to:
      control the unmanned flying object to capture an image of the parking lot;
      retrieve an empty space based on the captured image of the parking lot;
      control the unmanned flying object to move to a position of the retrieved empty space; and
      perform movement guidance of the vehicle to the empty space based on the movement of the unmanned flying object to the position of the retrieved empty space.

6. The first information processing device according to claim 5, wherein the control unit is further configured to control the unmanned flying object to move from a position of the vehicle to the position of the retrieved empty space.

7. The first information processing device according to claim 1, wherein the control unit is further configured to:
   control the unmanned flying object to move the unmanned flying object in the destination;
   control the unmanned flying object to capture an image of an inside of the destination; and
   retrieve a movement route in the destination based on the captured image of the inside of the destination.

8. The first information processing device according to claim 7, wherein the control unit is further configured to set the movement route in a moving object for movement of the moving object in the destination.

9. The first information processing device according to claim 1, wherein
   the first information processing device is in a vehicle,
   the control unit is further configured to change a control authority over the flight control of the unmanned flying object to a second information processing device of an occupant that gets off the vehicle, and
   the control authority is changed based on that the occupant gets off the vehicle.

10. The first information processing device according to claim 9, wherein
    the control unit is further configured to provide information to the second information processing device of the occupant, and
    the information is associated with the flight control of the unmanned flying object.

11. The first information processing device according to claim 1, wherein the display unit is configured to display the captured image.

12. The first information processing device according to claim 11, wherein the control unit is further configured to set an image size of the captured image based on an image display size on the display unit.

13. An information processing method, comprising:
    in an information processing device that includes a display unit and a control unit:
    causing the control unit to execute flight control of an unmanned flying object;
    causing the unmanned flying object to move the unmanned flying object to a destination, wherein the unmanned flying object is moved based on the execution of the flight control;
    setting an imaging direction of the unmanned flying object, wherein the imaging direction is set based on an arrangement of the display unit of the information processing device;
    causing the unmanned flying object to capture an image of one of the destination or a surrounding area of the destination, wherein the image of one of the destination or the surrounding area of the destination is captured based on the set imaging direction; and
    causing the control unit to execute movement control, wherein the movement control is executed based on the captured image of one of the destination or the surrounding area of the destination.

* * * * *